(12) United States Patent
Dwarakanath et al.

(10) Patent No.: US 10,592,398 B1
(45) Date of Patent: Mar. 17, 2020

(54) GENERATING A TEST SCRIPT EXECUTION ORDER

(71) Applicant: Accenture Global Solutions Limited, Dublin (IE)

(72) Inventors: Anurag Dwarakanath, Bangalore (IN); Neville Dubash, Mumbai (IN); Sanjay Podder, Thane (IN); Kishore P Durg, Bangalore (IN); Shrikanth N C, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/144,817

(22) Filed: Sep. 27, 2018

(51) Int. Cl.
| | |
|---|---|
| *G06F 9/44* | (2018.01) |
| *G06F 11/36* | (2006.01) |
| *G06F 11/00* | (2006.01) |
| *G06F 9/50* | (2006.01) |

(52) U.S. Cl.
CPC ........ *G06F 11/3672* (2013.01); *G06F 9/5038* (2013.01); *G06F 11/008* (2013.01); *G06F 11/36* (2013.01); *G06F 11/3608* (2013.01); *G06F 11/3684* (2013.01); *G06F 11/3688* (2013.01); *G06F 2201/81* (2013.01)

(58) Field of Classification Search
CPC ............. G06F 11/3608; G06F 11/3686; G06F 11/3604; G06F 11/3664; G06F 11/3672; G06F 11/36; G06F 11/3684; G06F 9/5038; G01R 31/319; G01R 31/2846; F01K 13/006; G11C 29/56008

See application file for complete search history.

(56) References Cited

U.S. PATENT DOCUMENTS

| | | | |
|---|---|---|---|
| 5,539,652 A * | 7/1996 | Tegethoff | G01R 31/2846 700/108 |
| 6,380,730 B1 * | 4/2002 | Arkin | G01R 31/319 324/750.01 |
| 8,522,083 B1 * | 8/2013 | Cohen | G06F 11/3672 714/38.1 |

(Continued)

OTHER PUBLICATIONS

G. Rothermel, R. H. Untch, C. Chu, and M. J. Harrold, "Test Case Prioritization: An Empirical Study," Proceedings of the International Conference on Software Maintenance, Oxford, UK, Sep. 1999, pp. 179-188, 10 pages.

(Continued)

*Primary Examiner* — Tuan A Vu
(74) *Attorney, Agent, or Firm* — Harrity & Harrity, LLP

(57) ABSTRACT

A device may determine probabilities for test scripts associated with a test to be executed on a software element, where a respective probability is associated with a respective test script, indicates a likelihood that the respective test script will be unsuccessful in a test cycle, and is determined based on historical test results, associated with the software element, for the respective test script. The device may generate, based on the probabilities, a test script execution order, of the test scripts, for the test cycle, and may execute, based on the test script execution order, the test on the software element in the test cycle. The device may dynamically generate, based on results for the test in the test cycle, an updated test script execution order, and may execute, based on the updated test script execution order, the test on the software element in the test cycle.

20 Claims, 13 Drawing Sheets

(56) References Cited

U.S. PATENT DOCUMENTS

| | | | |
|---|---|---|---|
| 2009/0216495 A1* | 8/2009 | Fujiwara | F01K 13/006 702/184 |
| 2011/0145653 A1* | 6/2011 | Broadfoot | G06F 11/3604 714/38.1 |
| 2012/0239347 A1* | 9/2012 | Nitta | G11C 29/56008 702/181 |
| 2012/0266136 A1* | 10/2012 | Brown | G06F 11/3664 717/124 |
| 2015/0178182 A1* | 6/2015 | Mallya | G06F 11/3676 717/124 |
| 2018/0189055 A1* | 7/2018 | Dasgupta | G06F 11/3608 |

OTHER PUBLICATIONS

S. Elbaum, G. Rothermel, and J. Penix, "Techniques for Improving Regression Testing in Continuous Integration Development Environments," Proceedings of the 22nd ACM SIGSOFT International Symposium on Foundations of Software Engineering, ACM 2014, pp. 235-245, 11 pages.

D. Hao, L. Zhang, L. Zang, Y. Wang, X. Wu, and T. Xie, "To Be Optimal or Not in Test-Case Prioritization," Journal of Latex Class Files, vol. 6, No. 1, 2007, 22 pages.

J.-M. Kim and A. Porter, "A History-Based Test Prioritization Technique for Regression Testing in Resource Constrained Environments," Software Engineering 2002, ICSE 2002, Proceedings of the 24rd International Conference on IEEE, 2002, pp. 119-129, 11 pages.

\* cited by examiner

| Test Script ID | Test Cycle 1 | Test Cycle 2 | Test Cycle 3 | Test Cycle 4 | Test Cycle 5 |
|---|---|---|---|---|---|
| $TS_1$ | Fail | Pass | Fail | Pass | Pass |
| $TS_2$ | Not run | Pass | Pass | Fail | |
| $TS_3$ | Pass | Pass | Pass | Pass | |
| $TS_4$ | Fail | Not run | Fail | Fail | |

108
Execute a first test script based on the test script execution order

GENERATING A TEST SCRIPT EXECUTION ORDER

BACKGROUND

A software test may exercise a software element for various purposes, such as determining whether the software element satisfies a design goal, identifying issues with the software element, troubleshooting issues with the software element, and/or the like.

SUMMARY

According to some possible implementations, a device may include one or more memories, and one or more processors, communicatively coupled to the one or more memories, to determine a plurality of probabilities for a plurality of test scripts that is associated with a test to be executed on a software element, wherein a respective probability, of the plurality of probabilities, is associated with a respective test script of the plurality of test scripts, wherein the respective probability indicates a likelihood that the respective test script will be unsuccessful in a test cycle, and wherein the respective probability is determined based on historical test results, associated with the software element, for the respective test script. The one or more processors may generate, based on the plurality of probabilities, a test script execution order, of the plurality of test scripts, for the test cycle, and may execute, based on the test script execution order, the test on the software element in the test cycle. The one or more processors may dynamically generate, based on results for the test in the test cycle, an updated test script execution order, and may execute, based on the updated test script execution order, the test on the software element in the test cycle.

According to some possible implementations, a non-transitory computer-readable medium may store instructions that include one or more instructions that, when executed by one or more processors of a device, cause the one or more processors to determine a plurality of first probabilities for a plurality of first test scripts that is associated with a test to be executed on a software element, wherein the plurality of first probabilities indicate a likelihood that the plurality of first test scripts will be unsuccessful in a test cycle. The one or more instructions may cause the one or more processors to generate, based on the plurality of first probabilities, a test script execution order, of the plurality of first test scripts, for the test cycle, and to execute, based on the test script execution order, a first test script, of the plurality of first test scripts, on the software element in the test cycle. The one or more instructions may cause the one or more processors to determine, based on a result of executing the first test script, a plurality of second probabilities for a plurality of second test scripts, to generate, based on the plurality of second probabilities, an updated test script execution order, and to execute, based on the updated test script execution order, a second test script, of the plurality of second test scripts, on the software element.

According to some possible implementations, a method may include determining, by a device, a plurality of first probabilities for a plurality of first test scripts that is associated with a test to be executed on a software element, wherein the plurality of first probabilities indicate a likelihood that the plurality of first test scripts will be unsuccessful in a test cycle. The method may include generating, by the device and based on the plurality of first probabilities, a test script execution order, of the plurality of first test scripts, for the test cycle, and executing, by the device and based on the test script execution order, a first test script, of the plurality of first test scripts, on the software element in the test cycle. The method may include determining, by the device, a plurality of second probabilities for a plurality of second test scripts, wherein the plurality of second probabilities is based on a first result of executing the first test script, and one or more second results, from one or more historical test cycles, for one or more second test scripts of the plurality of second test scripts. The method may include generating, by the device and based on the plurality of second probabilities, an updated test script execution order, and executing, by the device and based on the updated test script execution order, a third test script, of the plurality of second test scripts, on the software element.

DETAILED DESCRIPTION

Figure 1A:
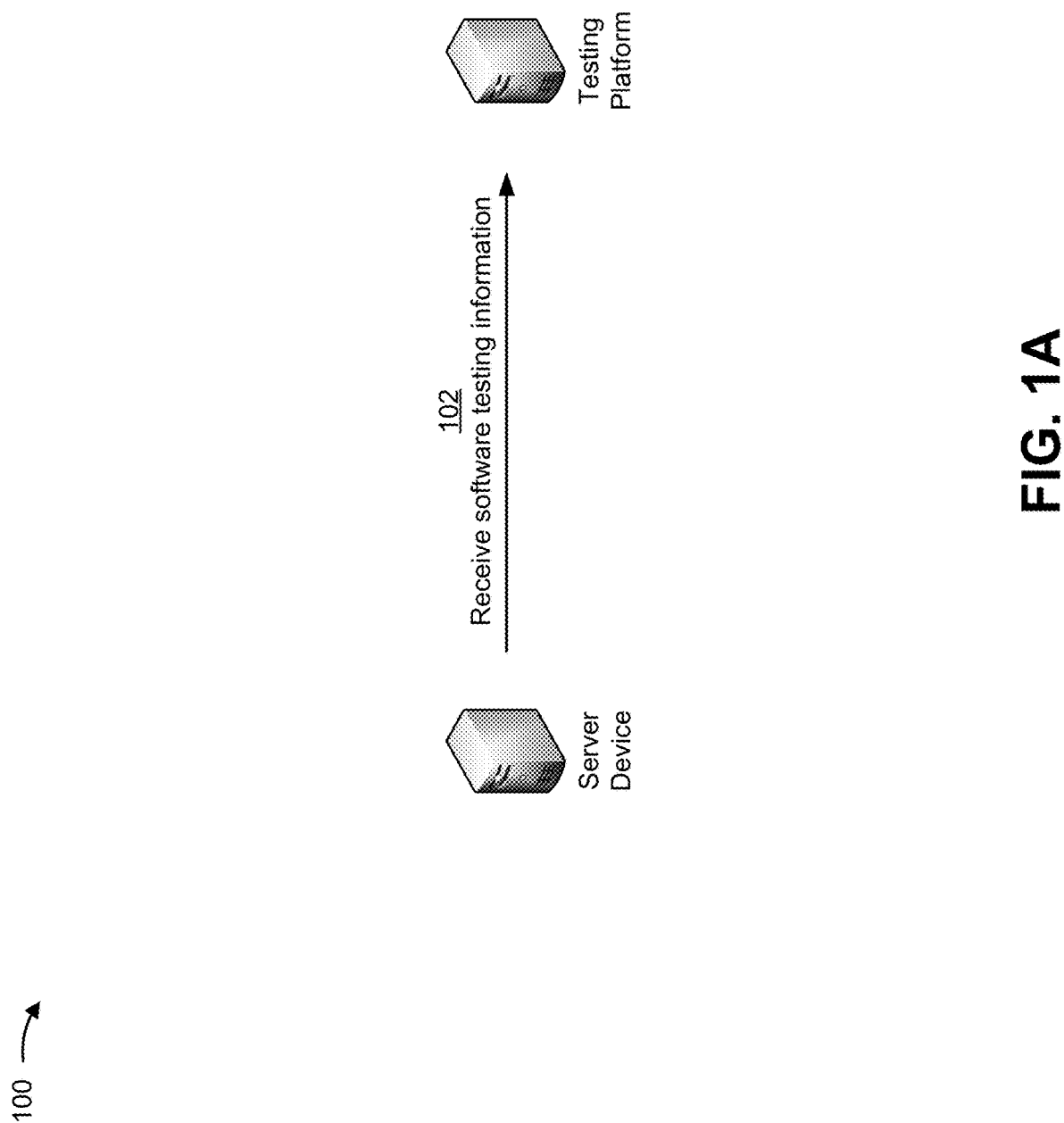
FIGS. 1A-1G are diagrams of an example implementation described herein.

The following detailed description of example implementations refers to the accompanying drawings. The same reference numbers in different drawings may identify the same or similar elements.

In some cases, a software test may include a plurality of test scripts that, when executed on a software element, exercise various portions of the software element, exercise the software element in different ways, and/or the like. In some cases, the plurality of test scripts may be executed on the software element in a random order, may be executed on the software element in a prioritized order, and/or the like.

The order in which the plurality of test scripts is executed may be determined based on various factors, such as the code associated with the software element, code churn of the software element, code quality (e.g. cyclomatic complexity and/or the like) of the software element, one or more process metrics associated with the software element, and/or the like. However, in practice, most real-world testing projects do not have such information, or the information is very difficult and/or expensive to gather and maintain. This may be particularly true in the independent verification and validation industry, where the entity testing the software element may be different from the entity that developed the software element. As a result, the entity that is testing the software element may be unable to determine a test script execution order where the only available data is the past execution history of test scripts.

Some implementations described herein provide a testing platform that is capable of generating a test script execution order, for a plurality of test scripts, in a "black-box" testing environment (e.g., where the testing platform may not have access to information other than historical test results for the plurality of test scripts). In this way, the testing platform executes the test scripts that have a greater likelihood of being unsuccessful before the test scripts that have a relatively lesser likelihood of being unsuccessful. In this way, the testing platform may execute the test scripts that have a greater likelihood of being unsuccessful first. This reduces the amount of time it takes to identify failures of the software element and allows the failures to be more quickly troubleshot. Moreover, if the testing platform determines that a particular test script with a greater likelihood of being unsuccessful has failed, the testing platform may abort the test of the software element sooner than if the test script execution order were not determined, which reduces the amount of processing, memory, and/or networking resources that the testing platform would have otherwise expended on executing other test scripts before the test script that ended up failing.

FIGS. 1A-1G are diagrams of an example implementation 100 described herein. As shown in FIGS. 1A-1G, implementation 100 may include a server device, a testing platform, and/or the like.

The server device may store and/or transmit software testing information, associated with a software element, to the testing platform. The software element may include a software application, software script, a software file, a codebase, software code, and/or any other type of software that is executable by a processor. The software testing information may include the software element to be tested, a plurality of test scripts to be executed on the software element in a software test, historical testing information associated with the software element, and/or the like.

In some implementations, the plurality of test scripts may exercise various portions, aspects, functions, and/or the like, of the software element. For example, a first test script, of the plurality of test scripts, may exercise a login function provided by the software element; a second test script, of the plurality of test scripts, may exercise a file upload function, and/or the like. In some implementations, the software testing information may include success criteria that identifies, for a particular test script of the plurality of test scripts, a parameter, an output, and/or the like, that, if generated by the software element, indicates that the test script executed successfully on the software element.

In some implementations, the historical testing information may include historical results of the plurality of test scripts being executed on the software element in one or more historical test cycles. A result for a test script, of the plurality of test scripts, may indicate whether the software element generated an output that satisfies the success criteria associated with the test script. For example, a result for a test script may indicate that the test script successfully executed on the software element (e.g., an indication of "pass", a binary 1 value, and/or the like), a result for the test script may indicate that the test script unsuccessfully executed on the software element (e.g., an indication of "fail", a binary 0 value, and/or the like), a result for the test script may indicate that the software element intermittently failed during execution of the test script (e.g., an indication of "flake", an indication of "intermittent fail", and/or the like), a result for the test script may indicate that the test script was not executed on the software element (e.g., an indication of "not run", an indication of "N/A", and/or the like), and/or the like.

In some implementations, the historical testing information may include historical test results, for the plurality of test scripts, on a per-test cycle basis. For example, the historical testing information may include a first set of historical results for a first test cycle, a second set of historical results for a second test cycle, and so on. The first set of historical results may indicate whether the plurality of test scripts successfully executed on the software element in the first test cycle, the second set of historical results may indicate whether the plurality of test scripts successfully executed on the software element in the second test cycle, and so on.

Turning to FIG. 1A, the testing platform may be instructed to perform a test on the software element. Accordingly, and as shown by reference number 102, the server device may transmit the software testing information, associated with the software element, to the testing platform. In some implementations, the testing platform may transmit a request, to the server device, for the software testing information based on being instructed to perform the test on the software element. In some implementations, the testing platform may receive, from the server device, the software testing information and the instruction to perform the test on the software element. In some implementations, the server device may transmit the software testing information to the testing platform based on receiving an input from a user (e.g., from a user device, from an input device associated with the server device, and/or the like).

As explained above, the software testing information, associated with the software element, may include a plurality of test scripts to be executed on the software element (e.g., test script $TS_1$ through $TS_4$), historical testing information for the software element, and/or the like. The historical testing information may include historical test results for the plurality of test scripts on a per-test cycle basis. For example, the historical testing information may include information identifying results for $TS_1$ through $TS_4$ in a first test cycle (e.g., Test Cycle 1), information identifying results for $TS_1$ through $TS_4$ in a second test cycle (e.g., Test Cycle 2), and so on. The above quantity of test scripts and/or test cycles are examples for illustrative purposes, and any quantity of test scripts and/or test cycles may be used.

Figure 1B:
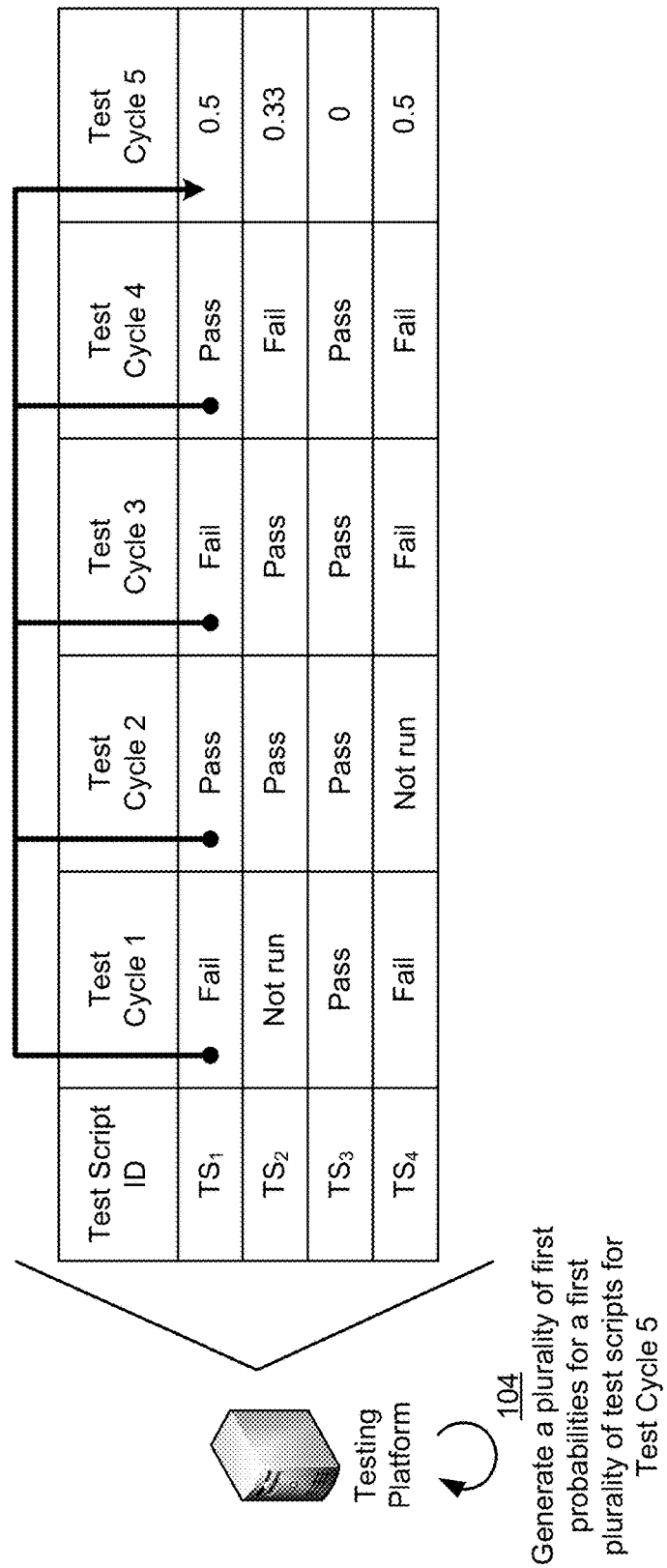

Turning to FIG. 1B, the testing platform may receive the software testing information associated with the software element, and may generate a test script execution order for a plurality of first test scripts (e.g., $TS_1$ through $TS_4$) in a test cycle (e.g., Test Cycle 5). The test script execution order may specify an order in which the plurality of first test scripts is to be executed on the software element in the test cycle. In some implementations, the testing platform may order the plurality of first test scripts, in the test script execution order, based on a plurality of probabilities associated with the plurality of first test scripts. A probability, associated with a particular test script, may indicate a likelihood that the execution of the test script on the software element will be unsuccessful. The probability associated with a particular test script may be specified in various formats, such as a percentage (e.g., 30%, 50%, and/or the like), an index (e.g., 0.2, 0.8, and/or the like), and/or the like.

As shown by reference number 104, the testing platform may determine a plurality of first probabilities for the plurality of first test scripts. The testing platform may use the plurality of first probabilities to perform a static generation of the test script execution order, in that the testing platform generates the test script execution order while the test is not being performed on the software element.

The testing platform may determine a particular probability, of the plurality of first probabilities, associated with a particular test script based on the historical test results for the plurality of first test scripts. For example, and as illustrated in FIG. 1B, the testing platform may determine the probability for $TS_1$, in Test Cycle 5, based on the historical test results for $TS_1$ in Test Cycle 1 through Test Cycle 4. The testing platform may similarly determine the respective probabilities for $TS_2$ through $TS_4$. In some implementations, when determining the plurality of first probabilities, the testing platform may not use results identified as "not run", may use results identified as "flake" or "intermittent fail" as "fail", and/or the like.

In some implementations, the testing platform may determine the probability for $TS_1$ based on one or more results patterns for $TS_1$, in a manner similar to a Markov model. The testing platform may select a quantity of historical test cycles and may determine a first results pattern for the quantity of historical test cycles. As an example, the testing platform may select a quantity of two historical test cycles, which may correspond to the two most recent test cycles (e.g., Test Cycle 3 and Test Cycle 4), and may determine the first results pattern as [Fail, Pass]. The testing platform may select the quantity of historical test cycles based on various criteria, such as based on input from a user, based on a total quantity of historical test cycles, for $TS_1$, included in the historical testing information (e.g., a specified percentage of the total quantity of historical test cycles), based on a specified time period (e.g., the historical test cycles executed on the software element in the most recent week, most recent month, and/or the like), and/or the like.

The testing platform may determine a second results pattern based on the first results pattern and an assumed result of executing $TS_1$ in Test Cycle 5. The assumed result may be a Pass result, a Fail result, and/or the like. Accordingly, the testing platform may determine the second results pattern as, for example, [Fail, Pass, Fail].

In some implementations, the testing platform may determine one or more quantities of occurrences that the one or more results patterns occurred in the historical test results for $TS_1$. For example, the testing platform may determine a first quantity of occurrences that the first results pattern occurred in the historical test results for $TS_1$, may determine a second quantity of occurrences that the second results pattern occurred in the historical test results for $TS_1$, and/or the like. For example, the testing platform may determine the quantity of occurrences that [Fail, Pass] occurred in Test Cycle 1 through Test Cycle 4 for $TS_1$, the testing platform may determine the quantity of occurrences that [Fail, Pass, Fail] occurred in Test Cycle 1 through Test Cycle 4 for $TS_1$, and/or the like.

In some implementations, the testing platform may determine the probability for $TS_1$ based on a ratio of the one or more results patterns according to equation (1):

$$P_{TS_1^5} = (TS_i^m = \text{fail} \mid TS_i^{m-1}, TS_i^{m-2}, \ldots, TS_i^{m-n}) = \frac{\text{count}(\text{Pattern 2})}{\text{count}(\text{Pattern 1})} \quad (1)$$

$$= \frac{\text{count}(TS_i^m = \text{fail}, TS_i^{m-1}, TS_i^{m-2}, \ldots, TS_i^{m-n})}{\text{count}(TS_i^{m-1}, TS_i^{m-2}, \ldots, TS_i^{m-n})}$$

where $P_{TS_1^5}$ is the probability that the execution of $TS_1$ on the software element in Test Cycle 5 will be unsuccessful, which may be determined as the ratio of the second quantity of occurrences of the second results pattern to the first quantity of occurrences of the first results pattern, i represents the test script for which the probability is to be determined (e.g., $TS_1$ in the example) m represents the test cycle to be executed (e.g., Test Cycle 5 in the example), and n represents the quantity of historical test cycles. Continuing with the example illustrated in FIG. 1B, the testing platform may determine that the second results pattern (e.g., [Fail, Pass, Fail]) occurs one time in the historical test results for $TS_1$ and may determine that first results pattern (e.g., [Fail, Pass]) occurs two times in the historical test results for $TS_1$. Accordingly, the testing platform may determine the probability for $TS_1$ in Test Cycle 5 as ½, 0.5, 50%, and/or any other format in which the ratio of the second results pattern and the first results pattern may be expressed. The testing platform may similarly determine the respective probabilities for $TS_2$, $TS_3$, and $TS_4$.

In some implementations, the testing platform may adjust (e.g., based on the first quantity of occurrences of the first results pattern, based on the second quantity of occurrences of the second results pattern, and/or the like) the quantity of historical test cycles that the testing platform uses to determine the first results pattern and the second results pattern. For example, the testing platform may determine that the second quantity of occurrences of the second results pattern for $TS_2$ does not satisfy a threshold quantity of occurrences (e.g., one occurrence, two occurrences, and/or the like), and may reduce the quantity of historical test cycles, associated with $TS_2$, that the testing platform is to use to determine the first results pattern and the second results pattern for $TS_2$. In this way, if the historical test results for a particular test script do not include enough information to determine a probability for the test script based on a particular quantity of historical test cycles, the testing platform may use a smaller quantity of historical test cycles so that the probability may be determined.

For example, the testing platform may use Test Cycle 3 and Test Cycle 4, and may use an assumed result that the execution of $TS_2$ in Test Cycle 5 will be unsuccessful. Accordingly, the testing platform may determine the first results pattern and the second results pattern respectively as [Pass, Fail] and [Pass, Fail, Fail]. The testing platform may determine that the quantity of occurrences of the second results pattern is zero, may determine that the quantity of occurrences of the second results pattern does not satisfy a threshold quantity of occurrences for the second results pattern (e.g., one occurrence), and accordingly may use Test Cycle 4 to determine the first results pattern and the second results pattern. As a result, the testing platform may determine the first results pattern and the second results pattern respectively as [Fail] and [Fail, Fail].

The testing platform may continue to reduce the quantity of historical test cycles that the testing platform uses to determine the first results pattern and the second results pattern until the second quantity of occurrences of the second results pattern satisfies the threshold quantity of occurrences. Accordingly, since the second quantity of occurrences of the second results pattern, with the quantity of historical test cycles being reduced to one (e.g., Test Cycle 4), does not satisfy the threshold quantity of occurrences of one, the testing platform may further reduce the quantity of historical test cycles to zero. In this case, since no historical test cycles are used in determining the first results pattern and the second results pattern, the testing platform may not use the first results pattern and may use, as the second result pattern, the assumed result that the execution of $TS_2$ in Test Cycle 5 will be unsuccessful. Accordingly, the testing platform may determine the first quantity of occurrences as the quantity of historical test cycles, for $TS_2$, in which a "pass" result or a "fail" result occurred for $TS_2$, and may determine the second quantity of occurrences as the quantity of historical test cycles, for $TS_2$, in which a "fail" result occurred. Thus, the testing platform may determine the probability for $TS_2$ as 0.33, since a "fail" result occurred in one test cycle (e.g., Test Cycle 4), since a "pass" result or a "fail" result occurred in three test cycles (e.g., Test Cycle 2, Test Cycle 3, and Test Cycle 4), and the ratio may be determined as ⅓.

Figure 1C:
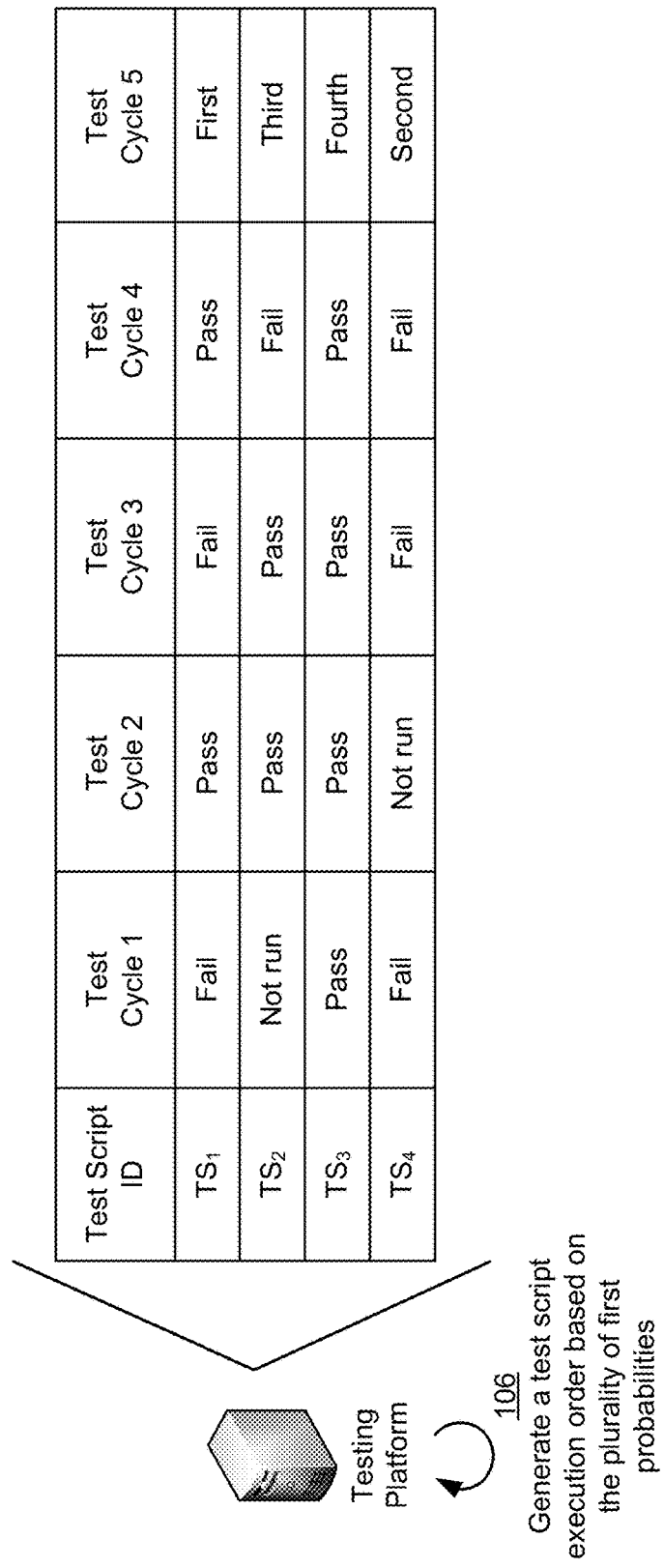

Turning to FIG. 1C, and as shown by reference number 106, the testing platform may generate the test script execution order, for the software element in Test Cycle 5, based on the plurality of first probabilities for the plurality of first test scripts. The testing platform may generate the test script execution order by ordering the plurality of first test scripts in an order of descending probability (e.g., from greatest probability to least probability). For example, if the testing platform determines the plurality of first probabilities for $TS_1$ through $TS_4$ to respectively be 0.5, 0.33, 0, and 0.5, the testing platform may generate the test script execution order such that $TS_1$ is to be executed first, $TS_4$ is to be executed second, $TS_2$ is to be executed third, and $TS_3$ is to be executed fourth.

In this way, the testing platform executes the test scripts that have a greater likelihood of being unsuccessful before the test scripts that have a relatively lesser likelihood of being unsuccessful. In this way, the testing platform may execute the test scripts that have a greater likelihood of being unsuccessful first so that the testing platform may more quickly determine, failures of the software element and the failures can be more quickly troubleshot. Moreover, if the testing platform determines that a particular test script with a greater likelihood of being unsuccessful has failed, the testing platform may abort the test of the software element sooner than if the test script execution order were not determined, which reduces the amount of processing, memory, and/or networking resources that the testing platform would have otherwise expended on executing other test scripts before the test script that ended up failing.

In some implementations, the testing platform may determine the same probability for two or more test scripts. For example, as illustrated in FIG. 1B, the testing platform determined the same probability for $TS_1$ and $TS_4$ (e.g., a 0.5 probability). In this case, the testing platform may determine the order of $TS_1$ and $TS_4$, in the test script execution order, based on various factors, such as based on a historical test execution order for $TS_1$ and $TS_4$ (e.g., based on whether $TS_1$ is historically executed before $TS_4$ and/or vice-versa), based on test script number (e.g., $TS_1$ is a lower test script number relative to $TS_4$ and may therefore be executed first), based on a random selection process (based on randomly selecting between $TS_1$ and $TS_4$), and/or the like.

Figure 1D:
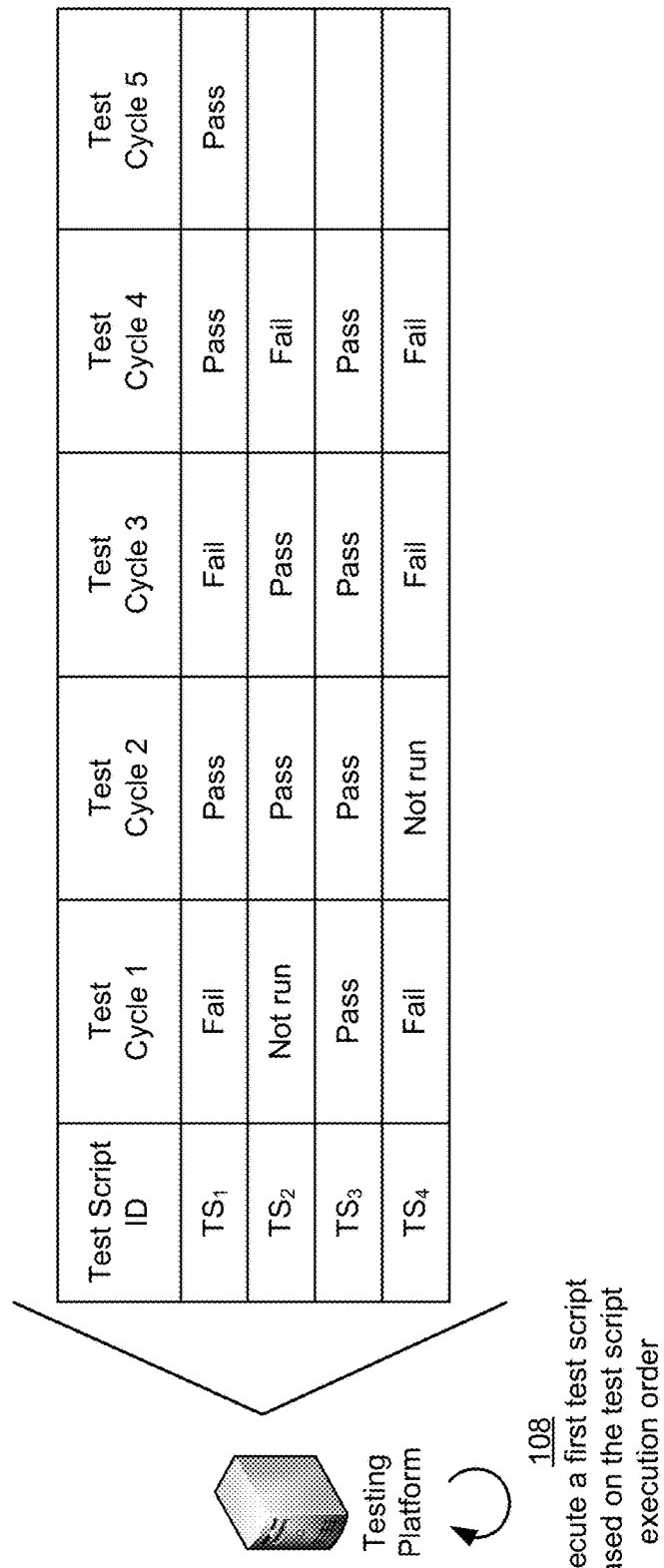

Turning to FIG. 1D, the testing platform may perform the test on the software element in Test Cycle 5 based on the test script execution order. Accordingly, as shown by reference number 108, the testing platform may initiate the test by executing $TS_1$ on the software element. The testing element may record the result for the execution of $TS_1$ in Test Cycle 5. As shown in FIG. 1D, it is assumed for illustration purposes that the execution of $TS_1$ in Test Cycle 5 is successful. Accordingly, the testing platform may record a "Pass" indicator for $TS_1$ in Test Cycle 5.

Figure 1E:
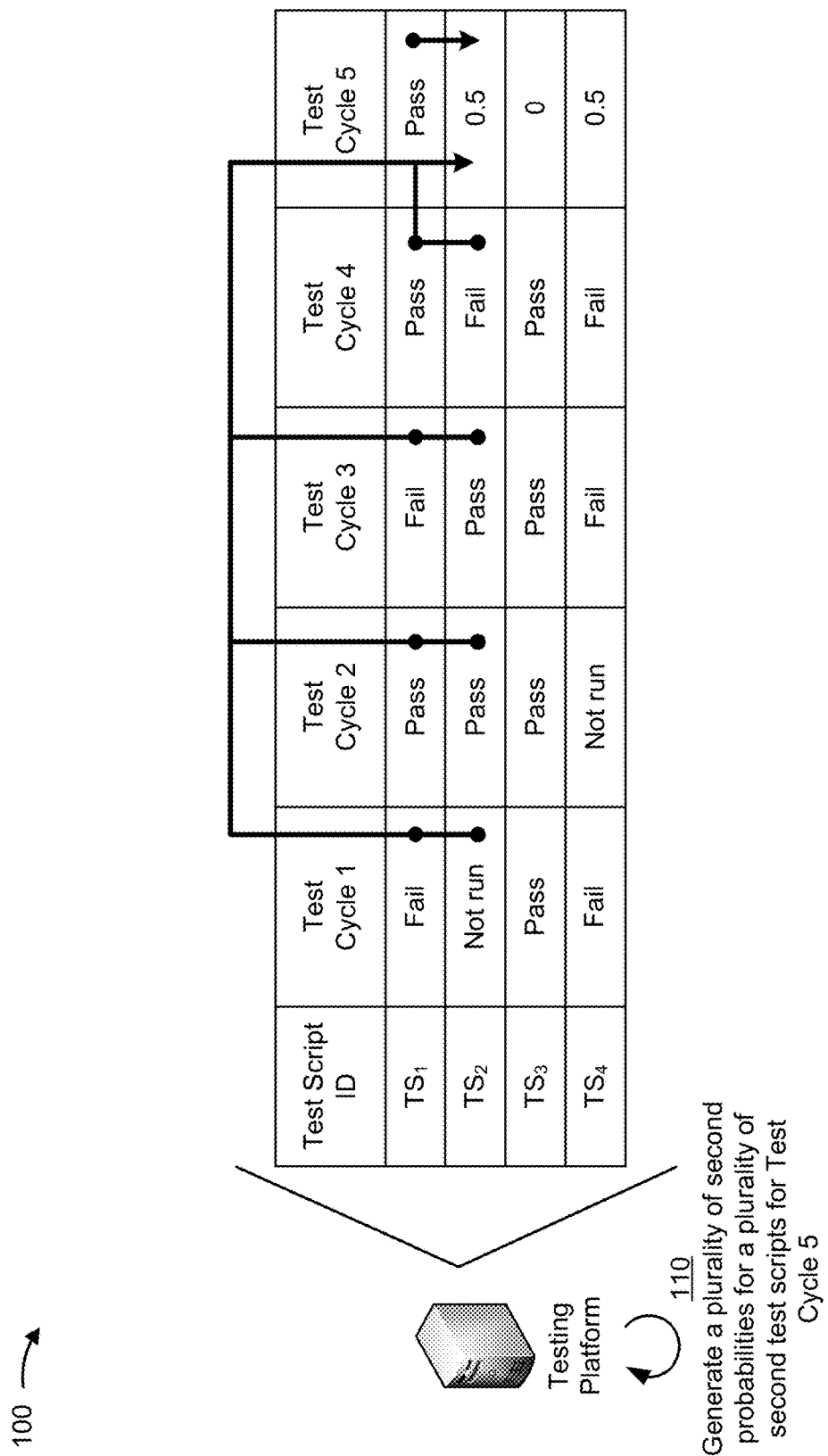

Turning to FIG. 1E, the testing platform may generate an updated test script execution order as the plurality of first test scripts are executed on the software element. In this way, the test script execution order is dynamically updated based on results that occur in the test cycle being executed. In this way, if a first test script is determined to be unsuccessful in the test cycle, the testing platform may determine that a second test script, that exercises functions, aspects, and/or the like, of the software element similar to the unsuccessful test script (e.g., a generate account details report function and a generate transactions report function), and thus is more likely to also be unsuccessful. Accordingly, a test script that is related to another test script, whose execution in the test cycle was determined to be unsuccessful, may be reprioritized such that the test script is executed earlier in the test script execution order, which reduces the amount of processing, memory, and/or networking resources that the testing platform would have otherwise expended on executing other test scripts before the test script that ended up failing.

As shown by reference number 110, to generate the updated test script execution order, the testing platform may determine a plurality of second probabilities for a plurality of second test scripts. The plurality of second test scripts may be different from the plurality of first test scripts in that the plurality of second test scripts does not include the test scripts, included in the plurality of first test scripts, that have already been executed in the test cycle.

In some implementations, the testing platform may generate a respective probability, of the plurality of second probabilities, for a respective test script (e.g., $TS_2$) of the plurality of second test scripts, based on the results of any test scripts that have been executed in the test cycle, based on historical test results for the test scripts that have been executed in the test cycle, based on historical test results for the respective test script, and/or the like. For example, the testing platform may determine a first results pattern for the test scripts that have been executed in Test Cycle 5. In the example illustrated in FIG. 1E, $TS_1$ has been executed in Test Cycle 5, and thus the testing platform may determine the first results pattern to be [Pass]. The testing platform may determine a second results pattern that includes the first results pattern and an assumed result for the execution of $TS_2$ in Test Cycle 5, such as an assumed result that the execution of $TS_2$ will be unsuccessful. Accordingly, in the example illustrated in FIG. 1E, the testing platform may determine the results pattern to be [Pass, Fail].

The testing platform may determine a first quantity of occurrences of the first results pattern in the historical test results for the test scripts that have been executed in the test cycle (e.g., for $TS_1$). For example, as shown in FIG. 1E, the testing platform may determine that the first results pattern [Pass] occurred in Test Cycle 2 and Test Cycle 4, and may accordingly determine the first quantity of occurrences of the first results pattern as two occurrences. The testing platform may determine a second quantity of occurrences of the second results pattern in the historical test results for the test scripts that have been executed in the test cycle (e.g., for $TS_1$) and the historical test results for $TS_2$. For example, as shown in FIG. 1E, the testing platform may determine that the second results pattern [Pass, Fail] occurred in Test Cycle 4, and may accordingly determine the second quantity of occurrences of the second results pattern as one occurrence.

The testing platform may determine the probability for $TS_2$ by determining a ratio of the second quantity of occurrences to the first quantity of occurrences according to equation (2):

$$P_{TS_2^5} = (TS_j^k = \text{fail} \mid TS_a^k, \ldots, TS_c^k) = \frac{\text{count(Pattern 2)}}{\text{count(Pattern 1)}} \quad (2)$$
$$= \frac{\text{count}(TS_j^k = \text{fail}, TS_a^k, \ldots, TS_c^k)}{\text{count}(TS_a^k, \ldots, TS_c^k)}$$

where $P_{TS_2^5}$ is the probability that the execution of $TS_2$ on the software element in Test Cycle 5 will be unsuccessful, which may be determined as the ratio of the second quantity of occurrences of the second results pattern to the first quantity of occurrences of the first results pattern, k represents the test cycle being executed (e.g., Test Cycle 5 in the example), j represents the test script for which the probability is to be determined (e.g., $TS_2$ in the example), and a-c represent the test scripts that have been executed in the test cycle. In this way, the testing platform determines a likelihood that the execution of $TS_2$ will be unsuccessful in Test Cycle 5 given the results for the test scripts that have been executed in Test Cycle 5. Accordingly, the testing platform may determine the probability for $TS_2$ in Test Cycle 5 as 2, 0.5, 50%, and/or any other format in which the ratio of the second results pattern and the first results pattern may be expressed. The testing platform may similarly determine the respective probabilities for $TS_3$ and $TS_4$.

In some implementations, the testing platform may adjust (e.g., based on the first quantity of occurrences of the first results pattern, based on the second quantity of occurrences of the second results pattern, and/or the like) the quantity, of test scripts that have been executed in the test cycle, that the testing platform uses to determine the first results pattern and/or the second results pattern. For example, the testing platform may determine that the second quantity of occurrences of the second results pattern for $TS_3$ does not satisfy a threshold quantity of occurrences (e.g., one occurrence, two occurrences, and/or the like), and may reduce the quantity, of test scripts that have been executed in the test cycle, that the testing platform uses to determine the first results pattern and/or the second results pattern for $TS_3$. In this way, if the historical testing information for the software element does not include enough information to determine a probability for a test script based on a particular results pattern, the testing platform may take a smaller quantity of test scripts, that have been executed in the test cycle, into account so that the probability may be determined.

As an example, the testing platform may use the result for $TS_1$ in Test Cycle 5, and may use an assumed result that the execution of $TS_3$ in Test Cycle 5 will be unsuccessful. Accordingly, the testing platform may determine the first results pattern and the second results pattern respectively as [Pass] and [Pass, Fail]. The testing platform may determine that the quantity of occurrences of the second results pattern is zero, may determine that the quantity of occurrences of the second results pattern does not satisfy a threshold quantity of occurrences for the second results pattern (e.g., one occurrence), and accordingly may reduce the quantity, of test scripts that have been executed in Test Cycle 5, that is used to determine the first results pattern and the second results pattern.

In this case, since $TS_1$ is the only test script executed so far in Test Cycle 5, reducing the quantity, of test scripts that have been executed in Test Cycle 5, that the testing platform uses to determine the first results pattern and the second results pattern may result in no test scripts that have been executed in Test Cycle 5 being taken into consideration. As a result, the testing platform may determine the first results pattern as any historical test cycle, for $TS_3$, in which a "pass" result or a "fail" result occurred, and may determine the second results pattern as the assumed result for the execution of $TS_3$ in Test Cycle 5. Thus, the testing platform may determine the first quantity of occurrences of the first results pattern as the quantity of historical test cycles in which a "pass" result or a "fail" result occurred for $TS_3$, and may determine the second quantity of occurrences as the quantity of historical test cycles, for $TS_3$, in which a "fail" result occurred. Accordingly, the testing platform may determine the probability for $TS_3$ as 0, since a "fail" result did not occur in any historical test cycle. Since the quantity, of test scripts that have been executed in Test Cycle 5, that is used to determine the first results pattern and the second results pattern cannot be reduced further in this case, the testing platform may determine the probability for $TS_3$ as 0.

Figure 1F:
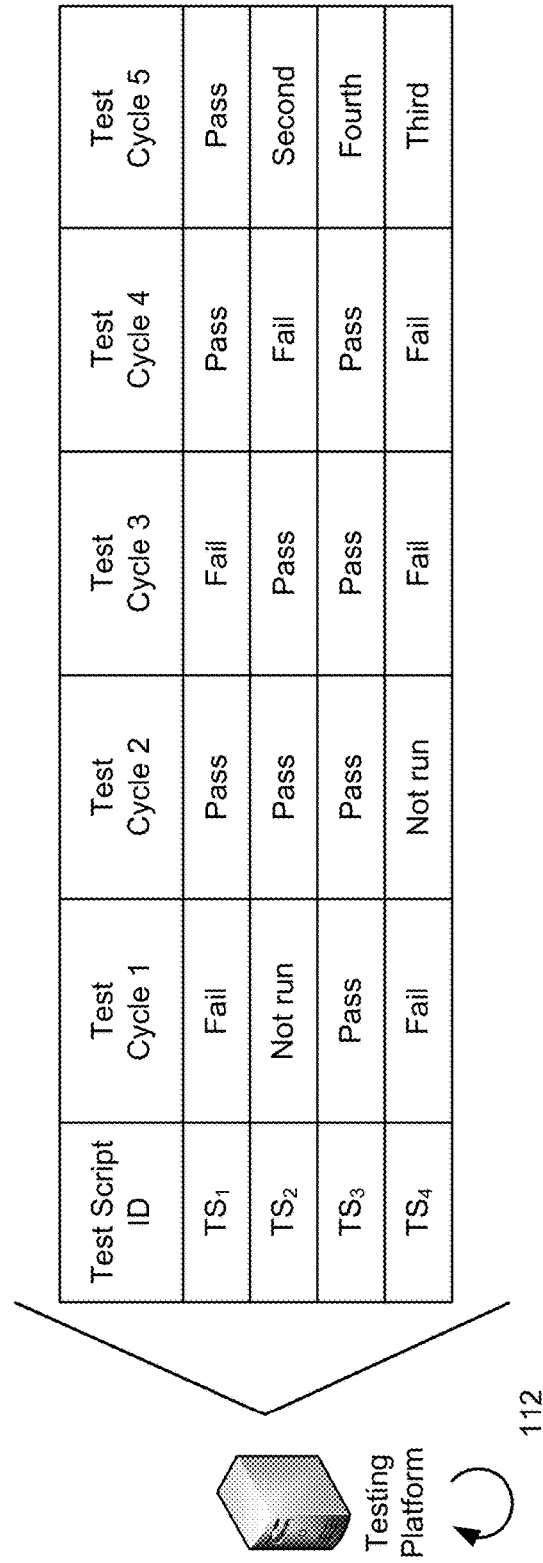

Turning to FIG. 1F, and as shown by reference number 112, the testing platform may generate the updated test script execution order, for the software element in Test Cycle 5, based on the plurality of second probabilities for the plurality of second test scripts. The testing platform may generate the test script execution order by ordering the plurality of second test scripts in an order of descending probability (e.g., from greatest probability to least probability). For example, if the testing platform determines the plurality of second probabilities for $TS_2$ through $TS_4$ to respectively be 0.5, 0, and 0.5, the testing platform may generate the test script execution order such that $TS_2$ is to be executed second (e.g., since $TS_1$ was already executed first in Test Cycle 5), $TS_4$ is to be executed second, and $TS_3$ is to be executed fourth. Accordingly, the probability of the execution of $TS_2$ in Test Cycle 5 increased from 0.33, prior to the execution of $TS_1$ in Test Cycle 5, to 0.5 after the execution of $TS_1$ in Test Cycle 5. The increase in probability may indicate a historical relationship between the result of the execution of $TS_1$ and the expected result of execution of $TS_2$. The historical relationship may indicate, in this case, that if the execution of $TS_1$ is successful in a particular test cycle, the execution of $TS_2$ in the test cycle is more likely to be unsuccessful. Accordingly, the testing platform may prioritize the execution of $TS_2$ in the test cycle so that, if the execution of $TS_2$ is unsuccessful, the testing platform identifies the failure of $TS_2$ faster, which in turn allows the testing platform to more quickly identify and troubleshoot failures of the software element. Moreover, if the testing platform determines that the execution of $TS_2$ is unsuccessful earlier in the test cycle, the testing platform may abort the test of the software element sooner than if the test script execution order were not dynamically updated, which reduces the amount of processing, memory, and/or networking resources that the testing platform would have otherwise expended on executing other test scripts before executing $TS_2$.

Figure 1G:
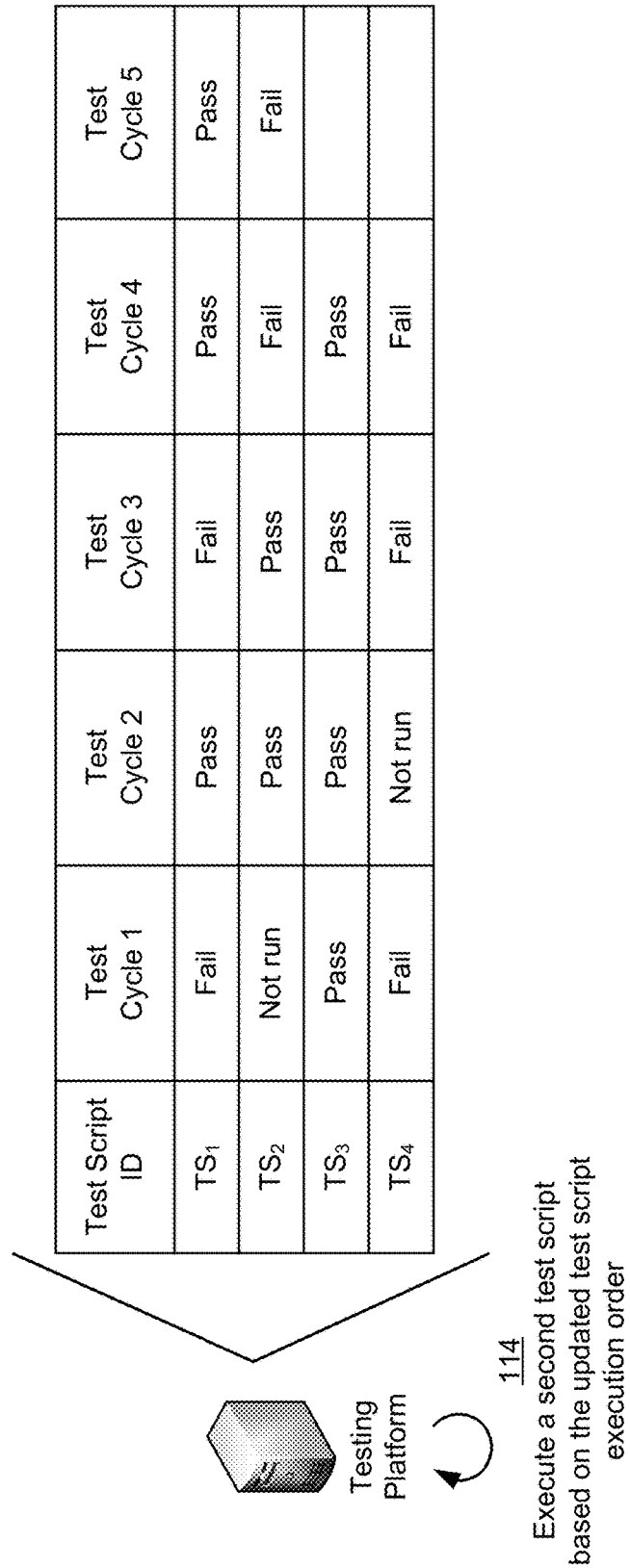

Turning to FIG. 1G, the testing platform may continue to perform the test on the software element in Test Cycle 5 based on the updated test script execution order. Accordingly, as shown by reference number 114, the testing platform may execute $TS_2$ on the software element. The testing element may record the result for the execution of $TS_2$ in Test Cycle 5. As shown in FIG. 1G, it is assumed for illustration purposes that the execution of $TS_2$ in Test Cycle 5 is unsuccessful. Accordingly, the testing platform may record a "Fail" indicator for $TS_2$ in Test Cycle 5.

The testing platform may perform various actions based on determining that the execution of $TS_2$ was unsuccessful in Test Cycle 5. For example, the testing platform may terminate the test in Test Cycle 5 so that no other test scripts are executed (e.g., may stop executing additional test scripts in the test cycle, which conserves computing, memory, and/or networking resources that would have otherwise been expended on executing the additional test scripts). As another example, the testing platform may troubleshoot the software element to determine the cause of the execution of $TS_2$ being unsuccessful (e.g., may perform one or more diagnostic tests, may perform a root-cause analysis, may perform a code review, and/or the like). As another example, the testing platform may provide a notification (e.g., via a user interface of the testing platform, to the user device that provided an instruction to perform the test on the software element, and/or the like) that indicates the execution of $TS_2$ was unsuccessful (e.g., may provide an indication of which test script was unsuccessful, information associated with the failure, and/or the like). As another example, the testing platform may continue the execution of the remaining test scripts in Test Cycle 5 (e.g., so that the results of the remaining test scripts may be determined, so that any other failures may be determined and troubleshot, and/or the like). As another example, if the testing platform is to continue the execution of the remaining test scripts, the testing platform may generate another updated test script execution order for Test Cycle 5, as described above.

As indicated above, FIGS. 1A-1G are provided merely as an example. Other examples are possible and may differ from what was described with regard to FIGS. 1A-1G.

Figure 2:
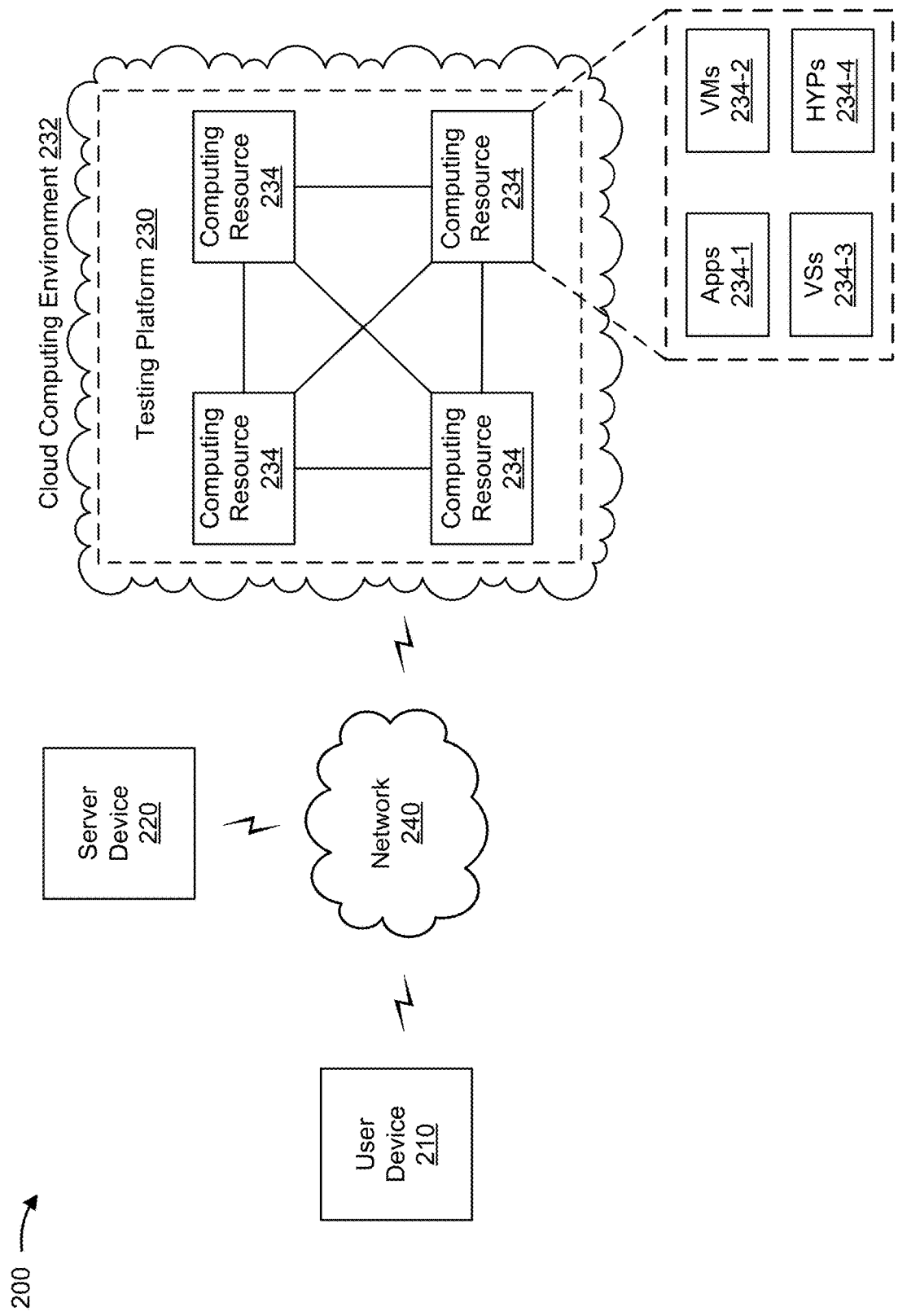
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a server device 220, a testing platform 230 in a cloud computing environment 232 that includes a set of computing resources 234, and a network 240. Devices of environment 200 may interconnect via wired connections, wireless connections, or a combination of wired and wireless connections.

User device 210 includes one or more devices capable of receiving, generating, storing, processing, and/or providing data associated with generating a test script execution order. For example, user device 210 may include a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a desktop computer, or a similar type of device.

In some implementations, user device 210 may receive input from a user (e.g., instructions to test a software element, inputs for configuring testing, and/or the like). In some implementations, user device 210 may transmit software testing information to server device 220 and/or testing platform 230 (e.g., based on receiving the input from the user, and/or the like). In some implementations, user device 210 may receive information (e.g., a notification, software testing results, and/or the like) from server device 220 and/or testing platform 230.

Server device 220 includes one or more devices capable of receiving, generating, storing, processing, and/or providing data associated with generating a test script execution order. In some implementations, server device 220 may include a stand-alone server, a rack-mountable server, a blade server, a data center, a virtualized server, a plurality of servers, and/or the like. In some implementations, server device 220 may store software testing information associated with a software element (e.g., based on receiving the software testing information from user device 210, and/or the like). In some implementations, server device 220 may provide software testing information to testing platform 230 (e.g., based on receiving a request from testing platform 230, based on receiving an input from a user (e.g., from user device 210, from an input device associated with server device 220, and/or the like), based on receiving the software testing information from user device 210, and/or the like).

Testing platform 230 includes one or more devices capable of receiving, generating, storing, processing, and/or providing data associated with generating a test script execution order. For example, testing platform 230 may transmit a request, to server device 220, for the software testing information based on being instructed to perform the test on the software element. In some implementations, testing platform 230 may generate a plurality of first probabilities for a first plurality of test scripts for a test cycle, may generate a test script execution order based on the plurality of first probabilities, may execute a first test script based on the test script execution order, may generate a plurality of second probabilities for a second plurality of test scripts for the test cycle, may update the test script execution order based on the second plurality of probabilities, may execute a second test script based on the updated test script execution order, and/or the like. In some implementations, testing platform 230 may receive, from server device 220, the software testing information, the instruction to perform the test on the software element, and/or the like.

In some implementations, as shown, testing platform 230 may be hosted in cloud computing environment 232. Notably, while implementations described herein describe testing platform 230 as being hosted in cloud computing environment 232, in some implementations, testing platform 230 may not be cloud-based (i.e., may be implemented outside of a cloud computing environment) or may be partially cloud-based.

Cloud computing environment 232 includes an environment that hosts testing platform 230. Cloud computing environment 232 may provide computation, software, data access, storage, and/or other services. As shown, cloud computing environment 232 may include a group of computing resources 234 (referred to collectively as "computing resources 234" and individually as "computing resource 234").

Computing resource 234 includes one or more personal computers, workstation computers, server devices, or another type of computation and/or communication device. In some implementations, computing resource 234 may host testing platform 230. The cloud resources may include compute instances executing in computing resource 234, storage devices provided in computing resource 234, data transfer devices provided by computing resource 234, etc. In some implementations, computing resource 234 may communicate with other computing resources 234 via wired connections, wireless connections, or a combination of wired and wireless connections.

Figure 3:
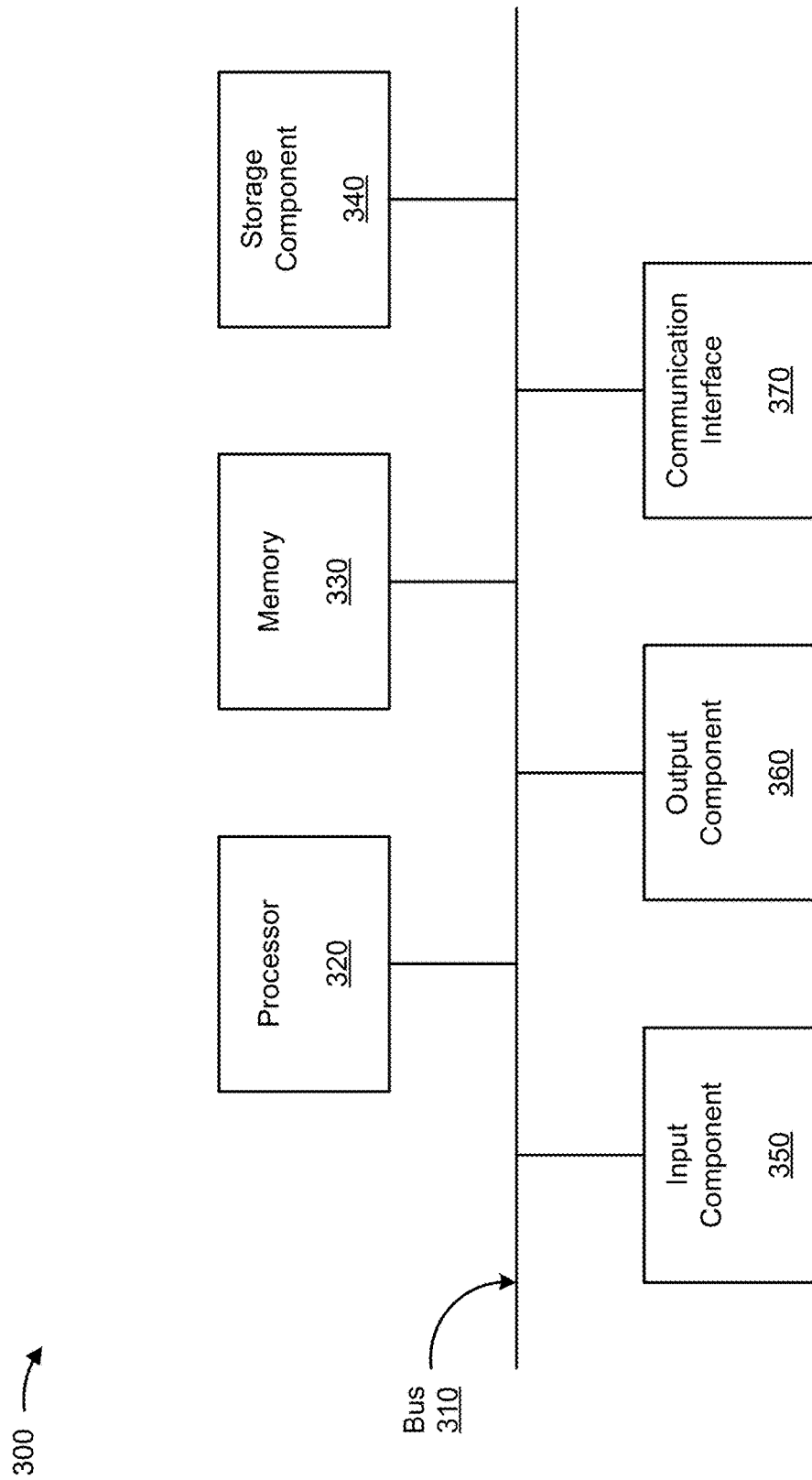
FIG. 3 is a diagram of example components of one or more devices of FIG. 2.

As further shown in FIG. 3, computing resource 234 may include a group of cloud resources, such as one or more applications ("APPs") 234-1, one or more virtual machines ("VMs") 234-2, one or more virtualized storages ("VSs") 234-3, or one or more hypervisors ("HYPs") 234-4.

Application 234-1 includes one or more software applications that may be provided to or accessed by one or more devices of environment 200. Application 234-1 may eliminate a need to install and execute the software applications on devices of environment 200. For example, application 234-1 may include software associated with testing platform 230 and/or any other software capable of being provided via cloud computing environment 232. In some implementations, one application 234-1 may send/receive information to/from one or more other applications 234-1, via virtual machine 234-2. In some implementations, application 234-1 may include a software application associated with one or more databases and/or operating systems. For example, application 234-1 may include an enterprise application, a functional application, an analytics application, and/or the like.

Virtual machine 234-2 includes a software implementation of a machine (e.g., a computer) that executes programs like a physical machine. Virtual machine 234-2 may be either a system virtual machine or a process virtual machine, depending upon use and degree of correspondence to any real machine by virtual machine 234-2. A system virtual machine may provide a complete system platform that supports execution of a complete operating system ("OS"). A process virtual machine may execute a single program, and may support a single process. In some implementations, virtual machine 234-2 may execute on behalf of a user (e.g., a user of user device 210, a user of server device 220, and/or the like), and may manage infrastructure of cloud computing environment 232, such as data management, synchronization, or long-duration data transfers.

Virtualized storage 234-3 includes one or more storage systems and/or one or more devices that use virtualization techniques within the storage systems or devices of computing resource 234. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 234-4 provides hardware virtualization techniques that allow multiple operating systems (e.g., "guest operating systems") to execute concurrently on a host computer, such as computing resource 234. Hypervisor 234-4 may present a virtual operating platform to the guest operating systems, and may manage the execution of the guest operating systems. Multiple instances of a variety of operating systems may share virtualized hardware resources.

Network 240 includes one or more wired and/or wireless networks. For example, network 240 may include a mobile network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

FIG. 3 is a diagram of example components of a device 300. Device 300 may correspond to user device 210, server device 220, testing platform 230, computing resource 234, and/or one or more devices included in network 240. In some implementations, user device 210, server device 220, testing platform 230, computing resource 234, and/or one or more devices included in network 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
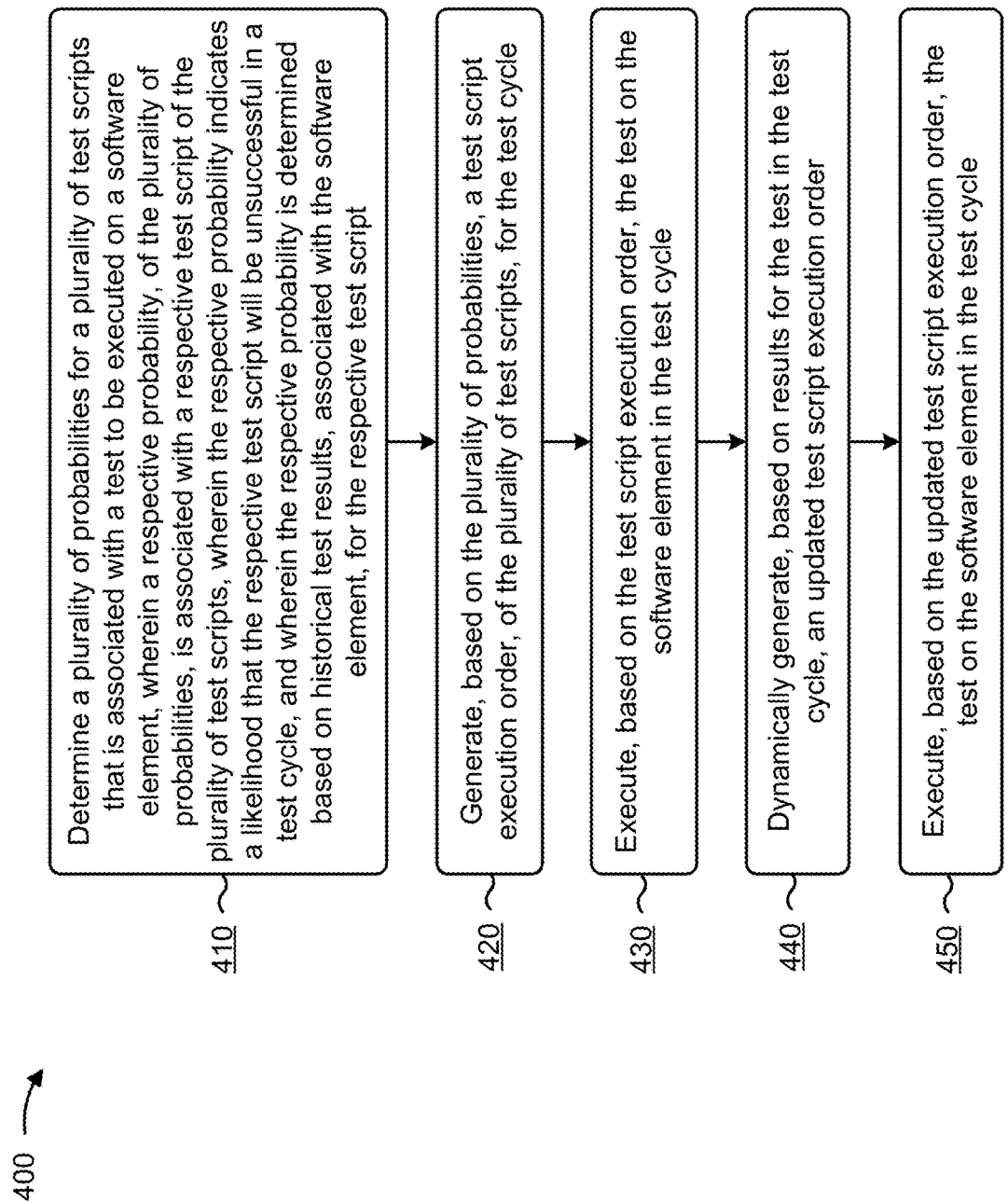
FIG. 4 is a flow chart of an example process for generating a test script execution order.

FIG. 4 is a flow chart of an example process 400 for generating a test script execution order. In some implementations, one or more process blocks of FIG. 4 may be performed by a testing platform (e.g., testing platform 230). In some implementations, one or more process blocks of FIG. 4 may be performed by another device or a group of devices separate from or including the testing platform, such as a user device (e.g., user device 210), a server device (e.g., server device 220), and/or the like.

As shown in FIG. 4, process 400 may include determining a plurality of probabilities for a plurality of test scripts that is associated with a test to be executed on a software element, wherein a respective probability, of the plurality of probabilities, is associated with a respective test script of the plurality of test scripts, wherein the respective probability indicates a likelihood that the respective test script will be unsuccessful in a test cycle, and wherein the respective probability is determined based on historical test results, associated with the software element, for the respective test script (block 410). For example, the testing platform (e.g., using computing resource 234, processor 320, memory 330, storage component 340, input component 350, communication interface 370, and/or the like) may determine a plurality of probabilities for a plurality of test scripts that is associated with a test to be executed on a software element, as described above in connection with FIGS. 1A-1G. In some implementations, a respective probability, of the plurality of probabilities, may be associated with a respective test script of the plurality of test scripts, the respective probability may indicate a likelihood that the respective test script will be unsuccessful in a test cycle, and the respective probability may be determined based on historical test results, associated with the software element, for the respective test script.

As further shown in FIG. 4, process 400 may include generating, based on the plurality of probabilities, a test script execution order, of the plurality of test scripts, for the test cycle (block 420). For example, the testing platform (e.g., using computing resource 234, processor 320, memory 330, storage component 340, output component 360, communication interface 370, and/or the like) may generate, based on the plurality of probabilities, a test script execution order, of the plurality of test scripts, for the test cycle, as described above in connection with FIGS. 1A-1G.

As further shown in FIG. 4, process 400 may include executing, based on the test script execution order, the test on the software element in the test cycle (block 430). For example, the testing platform (e.g., using computing resource 234, processor 320, memory 330, storage component 340, communication interface 370, and/or the like) may execute, based on the test script execution order, the test on the software element in the test cycle, as described above in connection with FIGS. 1A-1G.

As further shown in FIG. 4, process 400 may include dynamically generating, based on results for the test in the test cycle, an updated test script execution order (block 440). For example, the testing platform (e.g., using computing resource 234, processor 320, memory 330, storage component 340, output component 360, communication interface 370, and/or the like) may dynamically generate, based on results for the test in the test cycle, an updated test script execution order, as described above in connection with FIGS. 1A-1G.

As further shown in FIG. 4, process 400 may include executing, based on the updated test script execution order, the test on the software element in the test cycle (block 450). For example, the testing platform (e.g., using computing resource 234, processor 320, memory 330, storage component 340, communication interface 370, and/or the like) may execute, based on the updated test script execution order, the test on the software element in the test cycle, as described above in connection with FIGS. 1A-1G.

Process 400 may include additional implementations, such as any single implementation or any combination of implementations described below and/or in connection with one or more other processes described elsewhere herein.

In some implementations, when determining the plurality of probabilities for the plurality of test scripts, the testing platform may determine, for the respective test script, a first results pattern for a quantity of historical test cycles of the respective test script, may determine a first quantity of occurrences that the first results pattern occurred in the historical test results for the respective test script, may determine a second results pattern for the respective test script, where the second results pattern includes the first results pattern and an assumed result for the test cycle, may determine a second quantity of occurrences that the second results pattern occurred in the historical test results for the respective test script, and may determine the respective probability, associated with the respective test script, based on the first quantity of occurrences and the second quantity of occurrences.

In some implementations, when determining the respective probability associated with the respective test script, the testing platform may determine the respective probability based on a ratio of the first quantity of occurrences and the second quantity of occurrences. In some implementations, when determining the respective probability associated with the respective test script, the testing platform may determine whether the second quantity of occurrences satisfies a threshold quantity of occurrences, may reduce, based on determining that the second quantity of occurrences does not satisfy the threshold quantity of occurrences, the quantity of historical test cycles of the respective test script, and may determine the first results pattern and the second results pattern based on reducing the quantity of historical test cycles of the respective test script. In some implementations, the assumed result for the test cycle may be that the respective test script will be unsuccessful in the test cycle.

In some implementations, when generating the test script execution order, the testing platform may order the plurality of test scripts, in the test script execution order, from greatest respective probability to least respective probability. In some implementations, when executing the test on the software element in the test cycle, the testing platform may execute a first test script, of the plurality of test scripts, on the software element, where, when dynamically generating the updated test script execution order, the testing platform may generate the updated test script execution order based on a result of executing the first test script, and where, when executing, based on the updated test script execution order, the test on the software element in the test cycle, the testing platform may execute, based on the updated test script execution order, a second test script, of the plurality of test scripts, on the software element.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
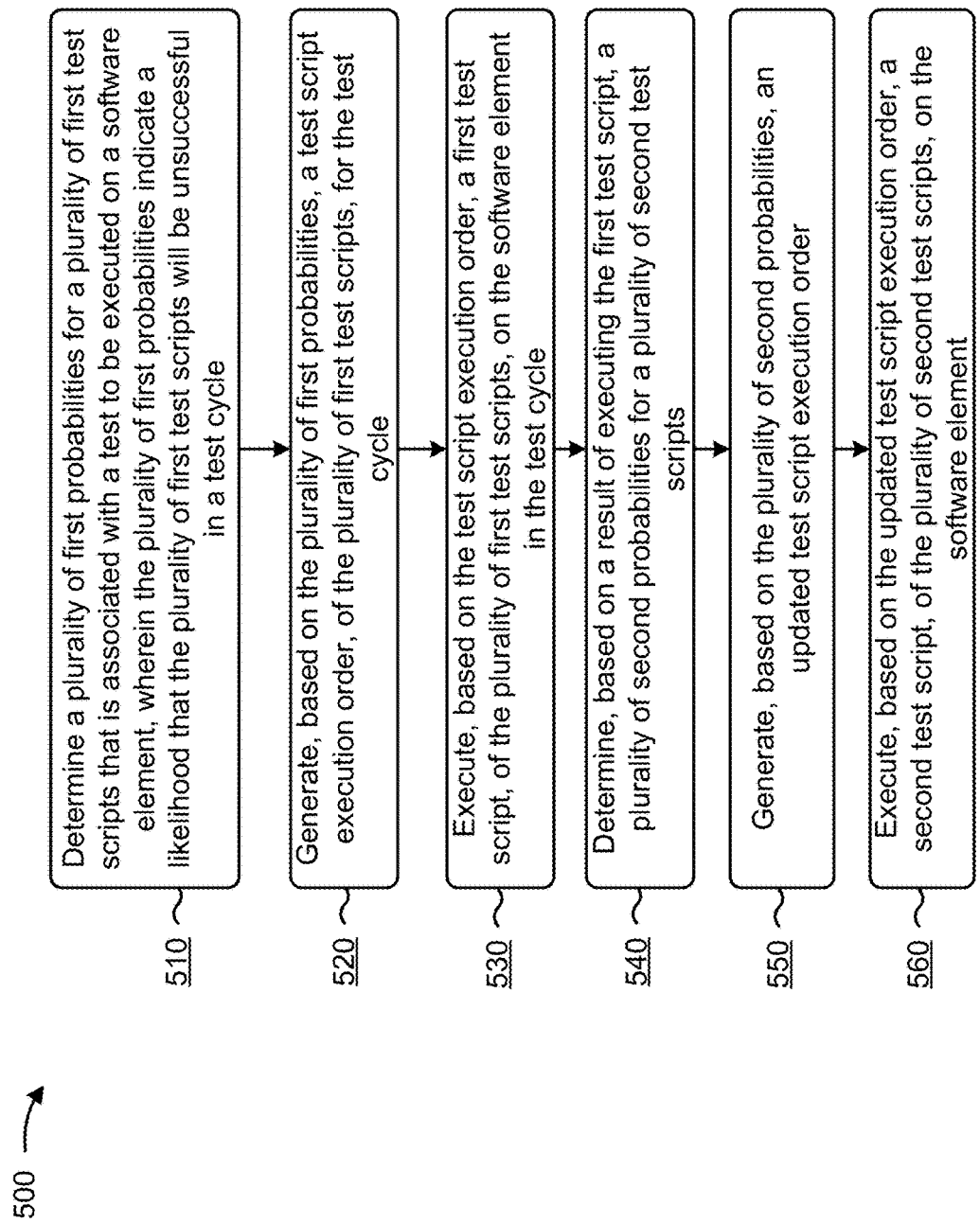
FIG. 5 is a flow chart of an example process for generating a test script execution order.

FIG. 5 is a flow chart of an example process 500 for generating a test script execution order. In some implementations, one or more process blocks of FIG. 5 may be performed by a testing platform (e.g., testing platform 230). In some implementations, one or more process blocks of FIG. 5 may be performed by another device or a group of devices separate from or including the testing platform, such as a user device (e.g., user device 210), a server device (e.g., server device 220), and/or the like.

As shown in FIG. 5, process 500 may include determining a plurality of first probabilities for a plurality of first test scripts that is associated with a test to be executed on a software element, wherein the plurality of first probabilities indicate a likelihood that the plurality of first test scripts will be unsuccessful in a test cycle (block 510). For example, the testing platform (e.g., using computing resource 234, processor 320, memory 330, storage component 340, input component 350, communication interface 370, and/or the like) may determine a plurality of first probabilities for a plurality of first test scripts that is associated with a test to be executed on a software element, as described above in connection with FIGS. 1A-1G. In some implementations, the plurality of first probabilities may indicate a likelihood that the plurality of first test scripts will be unsuccessful in a test cycle.

As further shown in FIG. 5, process 500 may include generating, based on the plurality of first probabilities, a test script execution order, of the plurality of first test scripts, for the test cycle (block 520). For example, the testing platform (e.g., using computing resource 234, processor 320, memory 330, storage component 340, output component 360, communication interface 370, and/or the like) may generate, based on the plurality of first probabilities, a test script execution order, of the plurality of first test scripts, for the test cycle, as described above in connection with FIGS. 1A-1G.

As further shown in FIG. 5, process 500 may include executing, based on the test script execution order, a first test script, of the plurality of first test scripts, on the software element in the test cycle (block 530). For example, the testing platform (e.g., using computing resource 234, processor 320, memory 330, storage component 340, communication interface 370, and/or the like) may execute, based on the test script execution order, a first test script, of the plurality of first test scripts, on the software element in the test cycle, as described above in connection with FIGS. 1A-1G.

As further shown in FIG. 5, process 500 may include determining, based on a result of executing the first test script, a plurality of second probabilities for a plurality of second test scripts (block 540). For example, the testing platform (e.g., using computing resource 234, processor 320, memory 330, storage component 340, input component 350, communication interface 370, and/or the like) may determine, based on a result of executing the first test script, a plurality of second probabilities for a plurality of second test scripts, as described above in connection with FIGS. 1A-1G.

As further shown in FIG. 5, process 500 may include generating, based on the plurality of second probabilities, an updated test script execution order (block 550). For example, the testing platform (e.g., using computing resource 234, processor 320, memory 330, storage component 340, output component 360, communication interface 370, and/or the like) may generate, based on the plurality of second probabilities, an updated test script execution order, as described above in connection with FIGS. 1A-1G.

As further shown in FIG. 5, process 500 may include executing, based on the updated test script execution order, a second test script, of the plurality of second test scripts, on the software element (block 560). For example, the testing platform (e.g., using computing resource 234, processor 320, memory 330, storage component 340, communication interface 370, and/or the like) may execute, based on the updated test script execution order, a second test script, of the plurality of second test scripts, on the software element, as described above in connection with FIGS. 1A-1G.

Process 500 may include additional implementations, such as any single implementation or any combination of implementations described below and/or in connection with one or more other processes described elsewhere herein.

In some implementations, when determining the plurality of second probabilities, the testing platform may determine a results pattern, for the first test script and the second test script, that includes the result of executing the first test script and includes an assumed result of executing the second test script in the test cycle, may determine a first quantity of historical test cycles in which the results pattern occurred, may determine a second quantity of historical test cycles in which the result of executing the first test script occurred, and may determine a respective probability, of the plurality of second probabilities, for the second test script based on the first quantity of historical test cycles and the second quantity of historical test cycles.

In some implementations, when determining the plurality of second probabilities, the testing platform may determine the respective probability for the second test script based on a ratio of the first quantity of historical test cycles and the second quantity of historical test cycles. In some implementations, when determining the plurality of second probabilities, the testing platform may determine whether the first quantity of historical test cycles satisfies a threshold quantity of historical test cycles, may determine a third quantity of historical test cycles in which the second test script was executed, and may determine the respective probability for the second test script based on another ratio of the second quantity of historical test cycles and the third quantity of historical test cycles.

In some implementations, the assumed result of executing the second test script may be that the second test script will be unsuccessful in the test cycle. In some implementations, when generating the updated test script execution order, the testing platform may order the plurality of second test scripts, in the updated test script execution order, from greatest respective probability to least respective probability. In some implementations, a third probability, of the plurality of first probabilities, for the second test script may be different from a fourth probability, of the plurality of second probabilities, for the second test script.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
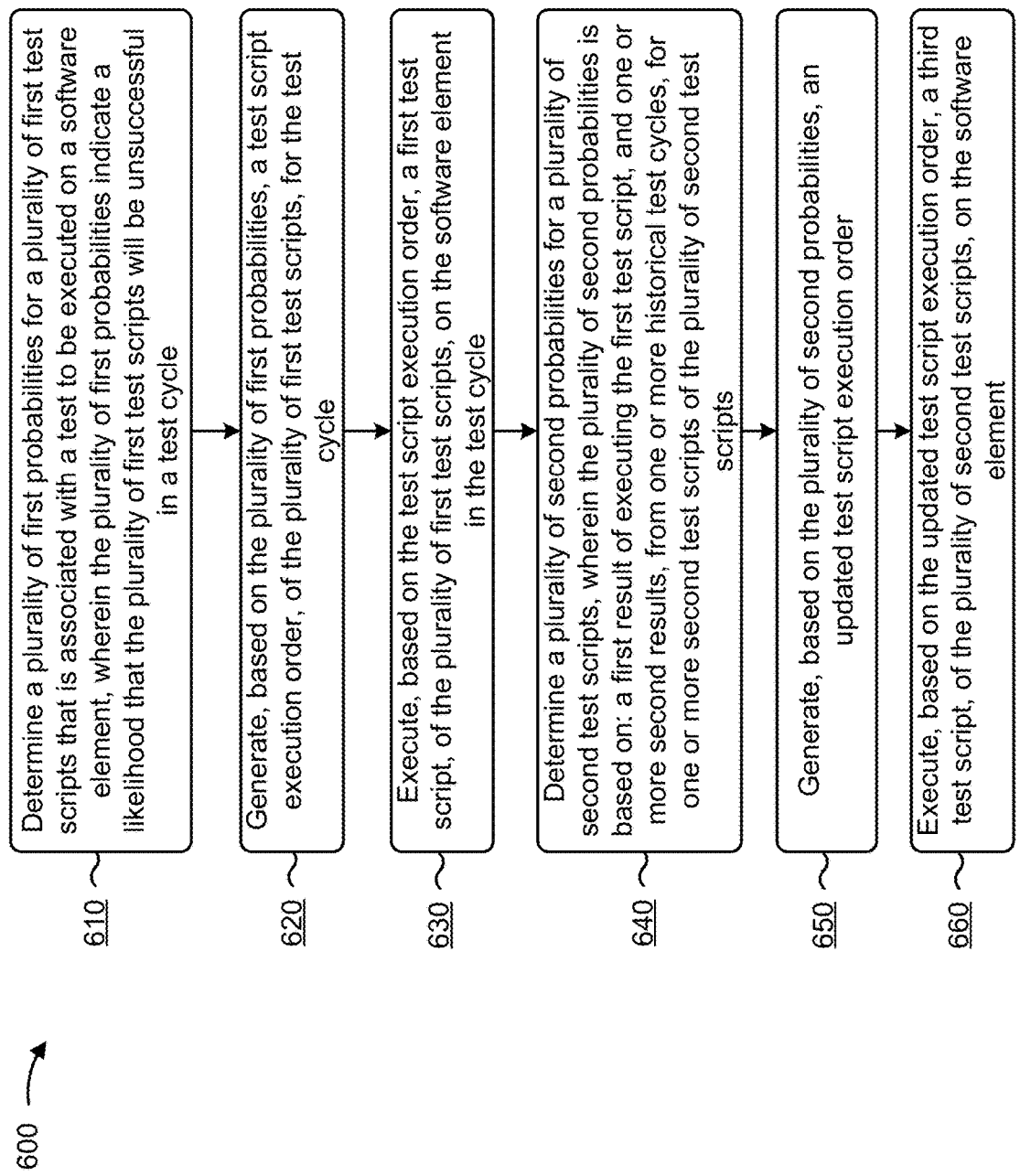
FIG. 6 is a flow chart of an example process for generating a test script execution order.

FIG. 6 is a flow chart of an example process 600 for generating a test script execution order. In some implementations, one or more process blocks of FIG. 6 may be performed by a testing platform (e.g., testing platform 230). In some implementations, one or more process blocks of FIG. 6 may be performed by another device or a group of devices separate from or including the testing platform, such as a user device (e.g., user device 210), a server device (e.g., server device 220), and/or the like.

As shown in FIG. 6, process 600 may include determining a plurality of first probabilities for a plurality of first test scripts that is associated with a test to be executed on a software element, wherein the plurality of first probabilities indicate a likelihood that the plurality of first test scripts will be unsuccessful in a test cycle (block 610). For example, the testing platform (e.g., using computing resource 234, processor 320, memory 330, storage component 340, input component 350, communication interface 370, and/or the like) may determine a plurality of first probabilities for a plurality of first test scripts that is associated with a test to be executed on a software element, as described above in connection with FIGS. 1A-1G. In some implementations, the plurality of first probabilities may indicate a likelihood that the plurality of first test scripts will be unsuccessful in a test cycle.

As further shown in FIG. 6, process 600 may include generating, based on the plurality of first probabilities, a test script execution order, of the plurality of first test scripts, for the test cycle (block 620). For example, the testing platform (e.g., using computing resource 234, processor 320, memory 330, storage component 340, output component 360, communication interface 370, and/or the like) may generate, based on the plurality of first probabilities, a test script execution order, of the plurality of first test scripts, for the test cycle, as described above in connection with FIGS. 1A-1G.

As further shown in FIG. 6, process 600 may include executing, based on the test script execution order, a first test script, of the plurality of first test scripts, on the software element in the test cycle (block 630). For example, the testing platform (e.g., using computing resource 234, processor 320, memory 330, storage component 340, communication interface 370, and/or the like) may execute, based on the test script execution order, a first test script, of the plurality of first test scripts, on the software element in the test cycle, as described above in connection with FIGS. 1A-1G.

As further shown in FIG. 6, process 600 may include determining a plurality of second probabilities for a plurality of second test scripts, wherein the plurality of second probabilities is based on a first result of executing the first test script, and one or more second results, from one or more historical test cycles, for one or more second test scripts of the plurality of second test scripts (block 640). For example, the testing platform (e.g., using computing resource 234, processor 320, memory 330, storage component 340, input component 350, communication interface 370, and/or the like) may determine a plurality of second probabilities for a plurality of second test scripts, as described above in connection with FIGS. 1A-1G. In some implementations, the plurality of second probabilities may be based on a first result of executing the first test script, and one or more second results, from one or more historical test cycles, for one or more second test scripts of the plurality of second test scripts As further shown in FIG. 6, process 600 may include generating, based on the plurality of second probabilities, an updated test script execution order (block 650). For example, the testing platform (e.g., using computing resource 234, processor 320, memory 330, storage component 340, output component 360, communication interface 370, and/or the like) may generate, based on the plurality of second probabilities, an updated test script execution order, as described above in connection with FIGS. 1A-1G.

As further shown in FIG. 6, process 600 may include executing, based on the updated test script execution order, a third test script, of the plurality of second test scripts, on the software element (block 660). For example, the testing platform (e.g., using computing resource 234, processor 320, memory 330, storage component 340, communication interface 370, and/or the like) may execute, based on the updated test script execution order, a third test script, of the plurality of second test scripts, on the software element, as described above in connection with FIGS. 1A-1G.

Process 600 may include additional implementations, such as any single implementation or any combination of implementations described below and/or in connection with one or more other processes described elsewhere herein.

In some implementations, the test script execution order may be different from the updated test script execution order. In some implementations, a third probability, of the plurality of first probabilities, for the third test script may be different from a fourth probability, of the plurality of second probabilities, for the third test script. In some implementations, the test script execution order and the updated test script execution order may be ordered from greatest respective probability, for the plurality of second test scripts, to least respective probability, for the plurality of second test scripts.

In some implementations, when generating the test script execution order, of the plurality of first test scripts, for the test cycle, the testing platform may generate the test script execution order prior to initiating the test cycle. In some implementations, when determining the plurality of first probabilities for the plurality of first test scripts, the testing platform may determine the plurality of first probabilities based on third results, in one or more other historical test cycles, for the plurality of first test scripts.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
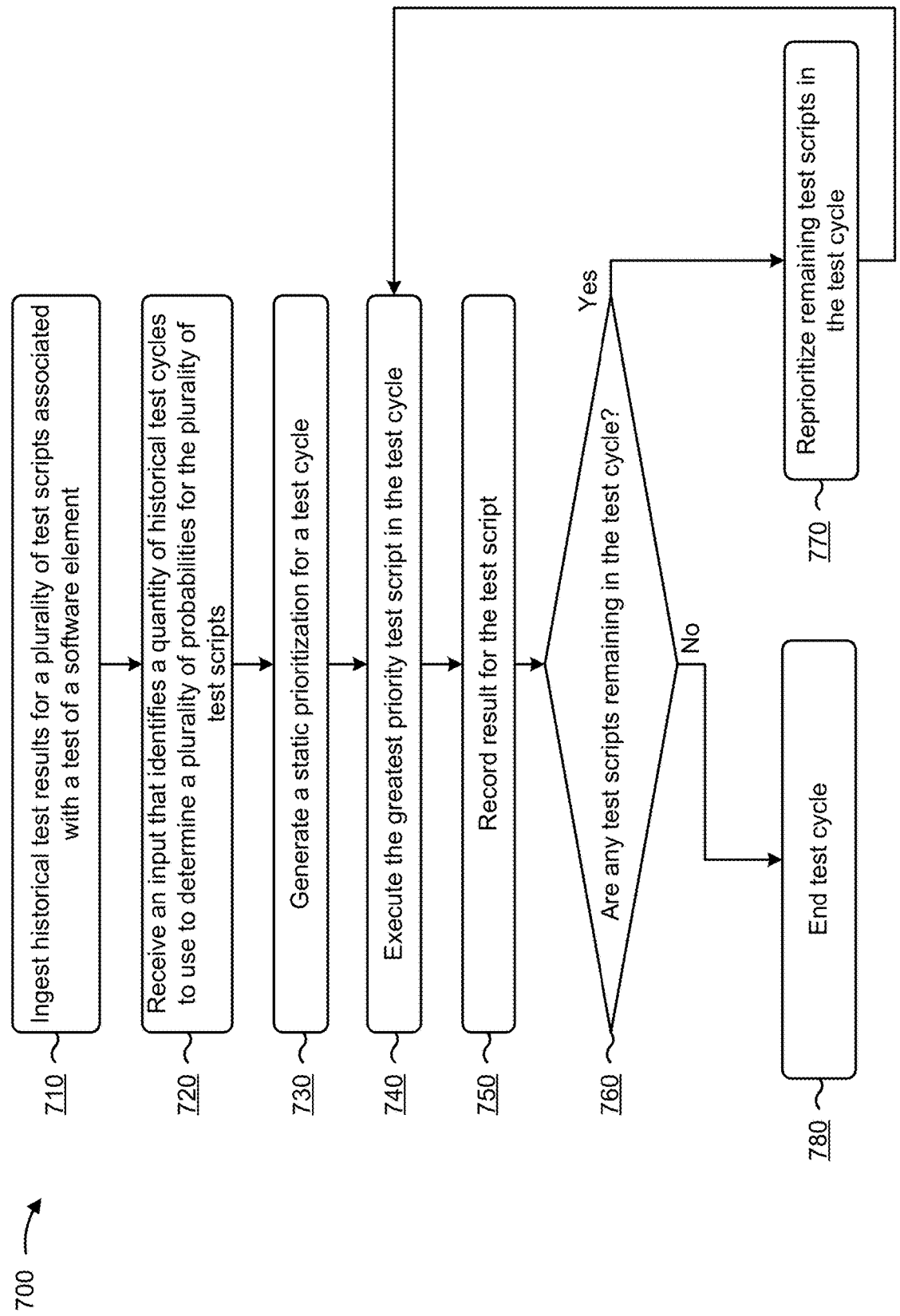
FIG. 7 is a flow chart of an example process for generating a test script execution order.

FIG. 7 is a flow chart of an example process 700 for generating a test script execution order. In some implementations, one or more process blocks of FIG. 7 may be performed by a device such as a testing platform (e.g., testing platform 230). In some implementations, one or more process blocks of FIG. 7 may be performed by another device or a group of devices separate from or including the testing platform, such as a user device (e.g., user device 210), a server device (e.g., server device 220), and/or the like.

As shown in FIG. 7, process 700 may include ingesting historical test results for a plurality of test scripts associated with a test of a software element (block 710). For example, the testing platform (e.g., using computing resource 234, processor 320, memory 330, storage component 340, input component 350, output component 360, communication interface 370, and/or the like) may ingest historical test results for a plurality of test scripts associated with a test of a software element, as described above in FIGS. 1A-1G. In some implementations, the testing platform may receive the historical test results from a server device.

As further shown in FIG. 7, process 700 may include receiving an input that identifies a quantity of historical test cycles to use to determine a plurality of probabilities for the plurality of test scripts (block 720). For example, the testing platform (e.g., using computing resource 234, processor 320, memory 330, storage component 340, input component 350, output component 360, communication interface 370, and/or the like) may receive an input that identifies a quantity of historical test cycles to use to determine a plurality of probabilities for the plurality of test scripts, as described above in FIGS. 1A-1G.

As further shown in FIG. 7, process 700 may include generating a static prioritization for a test cycle (block 730). For example, the testing platform (e.g., using computing resource 234, processor 320, memory 330, storage component 340, input component 350, output component 360, communication interface 370, and/or the like) may generate a static prioritization for a test cycle, as described above in FIGS. 1A-1G. In some implementations, the test cycle may be a test cycle in which the plurality of test scripts is to be executed on the software element. In some implementations, the static prioritization for the test cycle may include a test script execution order for the plurality of test scripts in the test cycle. In some implementations, the testing platform may generate the static prioritization based on the quantity of historical test cycles, based on the plurality of probabilities, based on the historical test results, and/or the like.

As further shown in FIG. 7, process 700 may include executing the greatest priority test script in the test cycle (block 740). For example, the testing platform (e.g., using computing resource 234, processor 320, memory 330, storage component 340, input component 350, output component 360, communication interface 370, and/or the like) may execute the greatest priority test script in the test cycle, as described above in FIGS. 1A-1G. In some implementations, the testing platform may execute the greatest priority test script based on the static prioritization for the test cycle.

As further shown in FIG. 7, process 700 may include recording a result for the test script (block 750). For example, the testing platform (e.g., using computing resource 234, processor 320, memory 330, storage component 340, input component 350, output component 360, communication interface 370, and/or the like) may record a result for the test script, as described above in FIGS. 1A-1G. In some implementations, the result may specify whether the execution of the test script, in the test cycle, was successful. In some implementations, the result may include information identifying the execution of the test script as a "pass" result, as a "fail" result, as a "flake" result, and/or the like.

As further shown in FIG. 7, process 700 may include determining whether there are any test scripts, of the plurality of test scripts, remaining in the test cycle (block 760). For example, the testing platform (e.g., using computing resource 234, processor 320, memory 330, storage component 340, input component 350, output component 360, communication interface 370, and/or the like) may determine whether there are any test scripts, of the plurality of test scripts, remaining in the test cycle, as described above in FIGS. 1A-1G.

As further shown in FIG. 7, if the testing platform determines that there are test scripts remaining in the test cycle (block 760—Yes), process 700 may include reprioritizing the remaining test scripts in the test cycle (block 770). For example, the testing platform (e.g., using computing resource 234, processor 320, memory 330, storage component 340, input component 350, output component 360, communication interface 370, and/or the like) may reprioritize the remaining test scripts in the test cycle, as described above in FIGS. 1A-1G. In some implementations, the testing platform may reprioritize the remaining test scripts in the test cycle based on the results that were recorded for the test scripts that have been executed in the test cycle, based on the historical test results, and/or the like. In some implementations, process 700 may return to block 740, where the testing platform may execute the greatest priority test script in the test cycle based on the reprioritization.

As further shown in FIG. 7, if the testing platform determines that there are no test scripts remaining in the test cycle (block 760-No), process 700 may include ending the test cycle (block 780). For example, the testing platform (e.g., using computing resource 234, processor 320, memory 330, storage component 340, input component 350, output component 360, communication interface 370, and/or the like) may end the test cycle, as described above in FIGS. 1A-1G.

Process 700 may include additional implementations, such as any single implementation or any combination of implementations described in connection with one or more other processes described elsewhere herein. Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more memories; and
one or more processors, communicatively coupled to the one or more memories, to:
determine a plurality of first probabilities for a plurality of test scripts that is associated with a test to be executed on a software element,
wherein a respective first probability, of the plurality of first probabilities, is associated with a respective test script of the plurality of test scripts,
wherein the respective first probability indicates a likelihood that the respective test script will be unsuccessful in a test cycle, and
wherein the respective first probability is determined based on historical test results, associated with the software element, for the respective test script;
generate, based on the plurality of first probabilities, a test script execution order, of the plurality of test scripts, for the test cycle,
wherein the plurality of test scripts are ordered from greatest respective probability to least respective probability;
execute, based on the test script execution order, the test on the software element in the test cycle,
wherein a first test script, of the plurality of test scripts, is executed based on the test script execution order;
determine, based on a result of executing the first test script, a plurality of second probabilities for a plurality of second test scripts,
wherein the plurality of second test scripts do not include the first test script,
wherein the plurality of second probabilities are used to generate an updated test script execution order, and
wherein the plurality of first probabilities are not used to generate the updated test script execution order;
generate, based on the plurality of second probabilities, the updated test script execution order; and
execute, based on the updated test script execution order, a second test script, of the plurality of second test scripts, on the software element in the test cycle.

2. The device of claim 1, wherein the one or more processors, when determining the plurality of first probabilities for the plurality of test scripts, are to:
determine, for the respective test script, a first results pattern for a quantity of historical test cycles of the respective test script;
determine a first quantity of occurrences that the first results pattern occurred in the historical test results for the respective test script;
determine a second results pattern for the respective test script,
wherein the second results pattern comprises:
the first results pattern, and
an assumed result for the test cycle;
determine a second quantity of occurrences that the second results pattern occurred in the historical test results for the respective test script; and
determine the respective first probability, associated with the respective test script, based on the first quantity of occurrences and the second quantity of occurrences.

3. The device of claim 2, wherein the one or more processors, when determining the respective first probability associated with the respective test script, are to:
determine the respective first probability based on a ratio of the first quantity of occurrences and the second quantity of occurrences.

4. The device of claim 3, wherein the one or more processors, when determining the respective first probability associated with the respective test script, are to:
determine whether the second quantity of occurrences satisfies a threshold quantity of occurrences;
reduce, based on determining that the second quantity of occurrences does not satisfy the threshold quantity of occurrences, the quantity of historical test cycles of the respective test script; and
determine the first results pattern and the second results pattern based on reducing the quantity of historical test cycles of the respective test script.

5. The device of claim 2, wherein the assumed result for the test cycle is that the respective test script will be unsuccessful in the test cycle.

6. The device of claim 1, wherein the one or more processors are further to:
determine that the execution of the second test script was unsuccessful; and
terminate, based on determining that the execution of the second test script was unsuccessful, the test so that a third test script is not executed.

7. The device of claim 1, wherein the one or more processors are further to:
determine that the execution of the second test script was unsuccessful; and
troubleshoot, based on determining that the execution of the second test script was unsuccessful, the software element to determine a cause of the execution of the second test script being unsuccessful.

8. A non-transitory computer-readable medium storing instructions, the instructions comprising:
one or more instructions that, when executed by one or more processors, cause the one or more processors to:
determine a plurality of first probabilities for a plurality of first test scripts that is associated with a test to be executed on a software element,
wherein the plurality of first probabilities indicate a likelihood that the plurality of first test scripts will be unsuccessful in a test cycle;
generate, based on the plurality of first probabilities, a test script execution order, of the plurality of first test scripts, for the test cycle,
wherein the plurality of first test scripts are ordered from greatest respective probability to least respective probability;
execute, based on the test script execution order, a first test script, of the plurality of first test scripts, on the software element in the test cycle,
wherein the first test script, of the plurality of first test scripts, is executed based on the test script execution order;
determine, based on a result of executing the first test script, a plurality of second probabilities for a plurality of second test scripts,
wherein the plurality of second test scripts do not include the first test script, wherein the plurality of second probabilities are used to generate an updated test script execution order, and wherein the plurality of first probabilities are not used to generate the updated test script execution order;

generate, based on the plurality of second probabilities, the updated test script execution order; and execute, based on the updated test script execution order, a second test script, of the plurality of second test scripts, on the software element.

9. The non-transitory computer-readable medium of claim 8, wherein the one or more instructions, that cause the one or more processors to determine the plurality of second probabilities, cause the one or more processors to:

determine a results pattern for the first test script and the second test script,
wherein the results pattern comprises:
the result of executing the first test script, and
an assumed result of executing the second test script in the test cycle;

determine a first quantity of historical test cycles in which the results pattern occurred;

determine a second quantity of historical test cycles in which the result of executing the first test script occurred; and determine a respective probability, of the plurality of second probabilities, for the second test script based on the first quantity of historical test cycles and the second quantity of historical test cycles.

10. The non-transitory computer-readable medium of claim 9, wherein the one or more instructions, that cause the one or more processors to determine the plurality of second probabilities, cause the one or more processors to:

determine the respective probability for the second test script based on a ratio of the first quantity of historical test cycles and the second quantity of historical test cycles.

11. The non-transitory computer-readable medium of claim 10, wherein the one or more instructions, that cause the one or more processors to determine the plurality of second probabilities, cause the one or more processors to:

determine whether the first quantity of historical test cycles satisfies a threshold quantity of historical test cycles;

determine a third quantity of historical test cycles in which the second test script was executed; and determine the respective probability for the second test script based on another ratio of the second quantity of historical test cycles and the third quantity of historical test cycles.

12. The non-transitory computer-readable medium of claim 9, wherein the assumed result of executing the second test script is that the second test script will be unsuccessful in the test cycle.

13. The non-transitory computer-readable medium of claim 8, wherein a third probability, of the plurality of first probabilities, for the second test script is different from a fourth probability, of the plurality of second probabilities, for the second test script.

14. The non-transitory computer-readable medium of claim 8, wherein the one or more instructions, when executed by the one or more processors, further cause the one or more processors to:

determine that the execution of the second test script was unsuccessful; and terminate, based on determining that the execution of the second test script was unsuccessful, the test so that a third test script is not executed.

15. A method, comprising:

determining, by a device, a plurality of first probabilities for a plurality of first test scripts that is associated with a test to be executed on a software element,
wherein the plurality of first probabilities indicate a likelihood that the plurality of first test scripts will be unsuccessful in a test cycle;

generating, by the device and based on the plurality of first probabilities, a test script execution order, of the plurality of first test scripts, for the test cycle,
wherein the plurality of first test scripts are ordered from greatest respective probability to least respective probability;

executing, by the device and based on the test script execution order, a first test script, of the plurality of first test scripts, on the software element in the test cycle,
wherein the first test script, of the plurality of test scripts, is executed based on the test script execution order;

determining, by the device, a plurality of second probabilities for a plurality of second test scripts,
wherein the plurality of second probabilities is determined based on:
a first result of executing the first test script, and
one or more second results, from one or more historical test cycles, for one or more second test scripts of the plurality of second test scripts,
wherein the plurality of second probabilities are used to generate an updated test script execution order,
wherein the plurality of first probabilities are not used to generate the updated test script execution order, and
wherein the one or more second test scripts do not include the first test script;

generating, by the device and based on the plurality of second probabilities, the updated test script execution order; and executing, by the device and based on the updated test script execution order, a third test script, of the plurality of second test scripts, on the software element.

16. The method of claim 15, wherein the test script execution order is different from the updated test script execution order.

17. The method of claim 15, wherein a third probability, of the plurality of first probabilities, for the third test script is different from a fourth probability, of the plurality of second probabilities, for the third test script.

18. The method of claim 15, wherein the test script execution order and the updated test script execution order are ordered from greatest respective probability, for the plurality of second test scripts, to least respective probability, for the plurality of second test scripts.

19. The method of claim 15, wherein generating the test script execution order, of the plurality of first test scripts, for the test cycle, comprises:

generating the test script execution order prior to initiating the test cycle.

20. The method of claim 15, wherein determining the plurality of first probabilities for the plurality of first test scripts comprises:

determining the plurality of first probabilities based on third results, in one or more other historical test cycles, for the plurality of first test scripts.

* * * * *